United States Patent
Chen et al.

(10) Patent No.: US 12,191,459 B2
(45) Date of Patent: *Jan. 7, 2025

(54) SECONDARY BATTERY, BATTERY MODULE, BATTERY PACK, AND ELECTRIC APPARATUS

(71) Applicant: CONTEMPORARY AMPEREX TECHNOLOGY (HONG KONG) LIMITED, Hong Kong (CN)

(72) Inventors: Peipei Chen, Ningde (CN); Limei Zhang, Ningde (CN); Yao Jiang, Ningde (CN); Jiao Liu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/607,120

(22) Filed: Mar. 15, 2024

(65) Prior Publication Data
US 2024/0283036 A1  Aug. 22, 2024

Related U.S. Application Data

(63) Continuation of application No. PCT/CN2022/084835, filed on Apr. 1, 2022.

(51) Int. Cl.
| | |
|---|---|
| *H01M 4/36* | (2006.01) |
| *C01B 25/45* | (2006.01) |
| *H01M 4/02* | (2006.01) |
| *H01M 4/58* | (2010.01) |
| *H01M 4/587* | (2010.01) |
| *H01M 10/0567* | (2010.01) |
| *H01M 10/42* | (2006.01) |

(52) U.S. Cl.
CPC ......... *H01M 10/4235* (2013.01); *C01B 25/45* (2013.01); *H01M 4/366* (2013.01); *H01M 4/5825* (2013.01); *H01M 4/587* (2013.01); *H01M 10/0567* (2013.01); *C01P 2002/52* (2013.01); *C01P 2004/86* (2013.01); *C01P 2006/40* (2013.01); *H01M 2004/028* (2013.01); *H01M 2220/20* (2013.01); *H01M 2300/0025* (2013.01)

(58) Field of Classification Search
None
See application file for complete search history.

(56) References Cited

U.S. PATENT DOCUMENTS

| | | | | |
|---|---|---|---|---|
| 11,888,150 | B2* | 1/2024 | Liu | H01M 4/136 |
| 11,973,218 | B2* | 4/2024 | Zhou | H01M 4/5825 |
| 2011/0217574 | A1* | 9/2011 | Toyama | H01M 10/052 |
| | | | | 429/61 |
| 2012/0009487 | A1* | 1/2012 | Hwang | H01M 10/0567 |
| | | | | 429/339 |
| 2018/0166679 | A1 | 6/2018 | Ophir et al. | |
| 2023/0327091 | A1* | 10/2023 | Ma | H01M 4/5825 |
| 2023/0361284 | A1* | 11/2023 | Ji | H01M 4/366 |

FOREIGN PATENT DOCUMENTS

| | | |
|---|---|---|
| CN | 105261740 A | 1/2016 |
| CN | 106058225 A | 10/2016 |
| CN | 108987697 A | 12/2018 |
| CN | 110416525 A | 11/2019 |
| CN | 114256448 A | 3/2022 |

OTHER PUBLICATIONS

The World Intellectual Property Organization (WIPO) International Search Report and Written Opinion for PCT/CN2022/084835 Nov. 25, 2022 15 Pages (including translation).

* cited by examiner

*Primary Examiner* — Anca Eoff
(74) *Attorney, Agent, or Firm* — ANOVA LAW GROUP, PLLC

(57) ABSTRACT

A secondary battery includes a positive electrode plate and a non-aqueous electrolyte. The positive electrode plate includes a positive electrode active material including a core and a shell enveloping the core. A chemical formula of the core is $Li_{1+x}Mn_{1-y}A_yP_{1-z}R_zO_4$, where the first coating layer includes a crystalline pyrophosphate $Li_aMP_2O_7$ and/or $M_b(P_2O_7)_c$, the second coating layer includes a crystalline phosphate $XPO_4$, and the third coating layer is carbon. The non-aqueous electrolyte includes a first additive including one or more selected from a group consisting of compounds represented by formula 1 and compounds represented by formula 2.

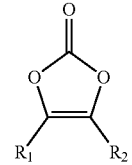

formula 1

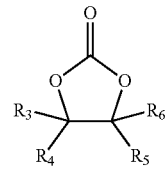

formula 2

24 Claims, 3 Drawing Sheets

SECONDARY BATTERY, BATTERY MODULE, BATTERY PACK, AND ELECTRIC APPARATUS

CROSS-REFERENCE TO RELATED APPLICATION

This application is a continuation of International Application No. PCT/CN2022/084835, filed on Apr. 1, 2022, the entire content of which is incorporated herein by reference.

TECHNICAL FIELD

This application relates to the field of lithium battery technologies, and in particular, to a secondary battery, a battery module, a battery pack, and an electric apparatus.

BACKGROUND

In recent years, with increasingly wide use of lithium-ion batteries, lithium-ion batteries have been widely used in energy storage power supply systems such as hydroelectric, thermal, wind, and solar power plants, and many other fields including electric tools, electric bicycles, electric motorcycles, electric vehicles, military equipment, and aerospace. Along with the great development of lithium-ion batteries, higher requirements are imposed on their energy density, cycling performance, safety performance, and the like.

Compared with other positive electrode active materials, lithium manganese phosphate positive electrode active materials have higher safety and better cycle life. However, lithium manganese phosphate has a disadvantage of poor rate performance. Currently, this problem is typically addressed through methods such as coating or doping. It would be still desired to further improve the rate performance, cycling performance, high-temperature stability, and the like of lithium manganese phosphate positive electrode active materials.

SUMMARY

This application has been made in view of the foregoing issues. An objective of this application is to provide a secondary battery, a battery module, a battery pack, and an electric apparatus so as to solve the problem of poor cycling performance of lithium manganese phosphate secondary batteries.

To achieve the foregoing objective, a first aspect of this application provides a secondary battery including a positive electrode plate and a non-aqueous electrolyte, where the positive electrode plate includes a positive electrode active material with a core-shell structure, and the positive electrode active material includes a core and a shell enveloping the core. A chemical formula of the core is $Li_{1+x}Mn_{1-y}A_yP_{1-z}R_zO_4$, where x is any value in the range of −0.100 to 0.100, y is any value in the range of 0.001-0.500, z is any value in the range of 0.001-0.100, A is one or more elements selected from a group consisting of Zn, Al, Na, K, Mg, Mo, W, Ti, V, Zr, Fe, Ni, Co, Ga, Sn, Sb, Nb, and Ge, optionally one or more elements from Fe, Ti, V, Ni, Co, and Mg, R is one or more elements selected from a group consisting of B, Si, N, and S, optionally, R being one element selected from B, Si, N, and S, and values of x, y, and z satisfy the following condition: making the entire core electrically neutral; the shell including a first coating layer enveloping the core, a second coating layer enveloping the first coating layer, and a third coating layer enveloping the second coating layer, where the first coating layer includes a crystalline pyrophosphate $Li_aMP_2O_7$ and/or $M_b(P_2O_7)_c$, where $0 \le a \le 2$, $1 \le b \le 4$, $1 \le c \le 6$, values of a, b, and c satisfy the following condition: making the crystalline pyrophosphate $Li_aMP_2O_7$ or $M_b(P_2O_7)_c$ electrically neutral, and each M in the crystalline pyrophosphate $Li_aMP_2O_7$ and $M_b(P_2O_7)_c$ is independently one or more elements selected from a group consisting of Fe, Ni, Mg, Co, Cu, Zn, Ti, Ag, Zr, Nb, and Al, the second coating layer includes a crystalline phosphate $XPO_4$, where X is one or more elements selected from a group consisting of Li, Fe, Ni, Mg, Co, Cu, Zn, Ti, Ag, Zr, Nb, and Al, and the third coating layer is carbon;

the non-aqueous electrolyte includes a first additive, the first additive including one or more from a group consisting of compounds shown in formula 1 and compounds shown in formula 2,

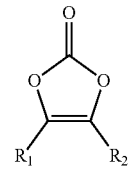

formula 1

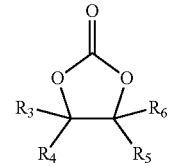

formula 2 where $R_1$ and $R_2$ each independently represent any one of a hydrogen atom, a halogen atom, a C1-C6 alkyl group, a C1-C6 haloalkyl group, a C1-C6 alkoxy group, a C2-C6 alkenyl group, or a C2-C6 alkynyl group; and $R_3$, $R_4$, $R_5$, and $R_6$ each independently represent any one of a hydrogen atom, a halogen atom, a C1-C6 alkyl group, a C1-C6 haloalkyl group, a C1-C6 alkoxy group, a C2-C6 alkenyl group, a C2-C6 alkynyl group, or a C2-C6 alkynyloxy group; and $R_3$, $R_4$, $R_5$, and $R_6$ do not all represent a hydrogen atom.

Unless otherwise specified, in the foregoing chemical formula, when A is two or more elements, the foregoing limitation on the value range of y is not only a limitation on the stoichiometric number of each element as A but also a limitation on the sum of the stoichiometric numbers of all elements as A. For example, when A is two or more elements A1, A2, . . . , An, the stoichiometric numbers y1, y2, . . . , yn of all of A1, A2, . . . , An must fall within the value range defined by this application for y, and the sum of y1, y2, . . . , yn must also fall within the value range. Similarly, in a case that R is two or more elements, the limitation on the value range of the stoichiometric number of R in this application also has the foregoing meaning.

In this specification, the crystalline means that the crystallinity is higher than 50%, to be specific, 50% to 100%. A crystallinity lower than 50% is called glassy state. The crystallinity of the crystalline pyrophosphate and the crystalline phosphate in this application is in the range of 50% to 100%. The pyrophosphate and phosphate with enough crystallinity are not only conducive to fully utilizing the pyrophosphate coating layer to hinder the dissolution of manganese ions and the excellent ability of the phosphate coating layer to conduct lithium ions, reducing the interface side reactions, but also enable the pyrophosphate coating layer and the phosphate coating layer to be better lattice matched, such that a tight binding between the coating layers can be achieved.

With element A doping at the manganese site and element R doping at the phosphorus site in lithium manganese phosphate to obtain a doped lithium manganese phosphate core and the core surface being sequentially coated with three layers, this application provides a new type of lithium manganese phosphate positive electrode active material with a core-shell structure. Applying such positive electrode active material to secondary batteries can significantly improve the high-temperature cycling performance, cycling stability, and high-temperature storage performance of the secondary battery.

Moreover, a first additive is introduced into the non-aqueous electrolyte to form a polymer layer on the surface of the coating layer during charging of the lithium-ion battery. This prevents the dissolution of the coating layers, reduces the dissolution of manganese ions, lowers the catalytic activity of the coated carbon, and reduces active lithium consumption, thereby further improving the high-temperature cycling and storage performance of the secondary battery.

The compound of the foregoing formula 1 is selected from common formula 1 compounds in the related art. In some embodiments, $R_1$ and $R_2$ each independently represent any one of a hydrogen atom, a halogen atom, a C1-C4 alkyl group, a C1-C4 haloalkyl group, a C1-C4 alkoxy group, a C2-C4 alkenyl group, or a C2-C4 alkynyl group, and optionally, $R_1$ and $R_2$ each independently represent any one of a hydrogen atom, a halogen atom, a C1-C4 alkyl group, a C1-C2 haloalkyl group, or a C2-C3 alkenyl group.

The compound of the foregoing formula 2 is selected from common formula 2 compounds in the related art. In some embodiments, $R_3$, $R_4$, $R_5$, and $R_6$ each independently represent any one of a hydrogen atom, a halogen atom, a C1-C4 alkyl group, a C1-C4 haloalkyl group, a C1-C4 alkoxy group, a C2-C4 alkenyl group, a C2-C4 alkynyl group, or a C2-C4 alkynyloxy group, optionally, $R_3$, $R_4$, $R_5$, and $R_6$ each independently represent any one of a hydrogen atom, a halogen atom, a C1-C3 alkyl group, a C1-C2 haloalkyl group, a C1-C4 alkoxy group, a C2-C4 alkenyl group, or a C2-C4 alkynyloxy group, and $R_3$, $R_4$, $R_5$, and $R_6$ do not all represent a hydrogen atom.

Further, in some embodiments, the first additive includes at least one of the following compounds:

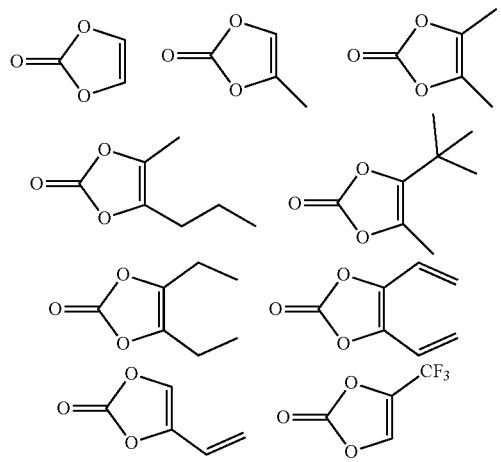

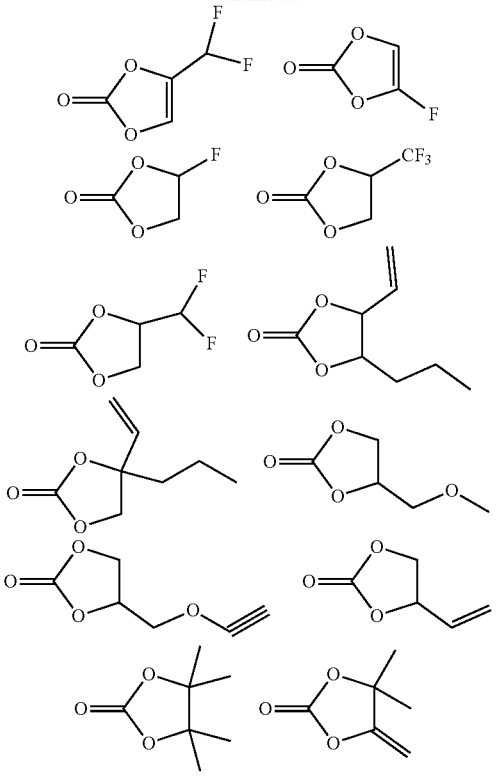

An excessive amount of the first additive increases the impedance of the positive electrode, resulting in abnormal capacity and deteriorated rate performance of the secondary battery. In addition, an excessive amount of the first additive causes oxidation and gas generation during the lithium-ion charging process, deteriorating the high-temperature cycling and storage performance of the secondary battery. In some embodiments, based on a total weight of the non-aqueous electrolyte, a percentage of the first additive is W1% by weight, W1 being 0.01 to 20, optionally 0.2 to 8 or 0.5 to 5. The mass percentage of the first additive in the electrolyte within the foregoing range can prevent the coating layers of pyrophosphate and phosphate from being dissolved, lower the catalytic activity of the coated carbon, and also avoid an increase in the impedance of the positive electrode, thereby further improving the high-temperature cycling and storage performance of the secondary battery without impairing the capacity and rate performance of the lithium-ion battery.

In some embodiments, the first additive is any one of the following compounds:

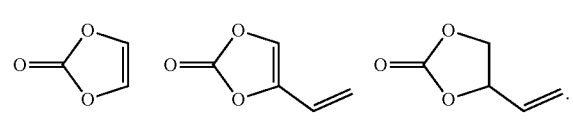

The polymers formed by the first additives above are more stable during the charging process, thus improving the dissolution of Mn in the positive electrode active material of this application more efficiently.

The first additive is used to form a polymer layer on the positive electrode, to prevent the dissolution of the coating layers, reduce the dissolution of manganese ions, lower the catalytic activity of the coated carbon, and reduce active lithium consumption. However, the first additive also increases the impedance of the positive electrode and deteriorates the capacity and rate performance of the secondary battery. To address the negative effects caused by the first additive, in some embodiments, the non-aqueous electrolyte also includes a second additive. The second additive includes one or more from a group consisting of ethylene sulfate, lithium difluorophosphate, lithium difluorooxalate phosphate, and lithium difluorooxalate borate. Each of the foregoing second additives can be used to generate a film on the positive electrode to form a low-resistance CEI film, further improving the capacity and rate performance of the secondary battery.

In some embodiments, based on the total weight of the non-aqueous electrolyte, a percentage of the second additive is W2% by weight, W2 being 0.01 to 20, optionally 0.2 to 8 or 0.3 to 5, so as to form a low-impedance CEI film with an appropriate thickness.

In some embodiments, based on the total weight of the non-aqueous electrolyte, the percentage of the first additive is W1% by weight, W1 being 0.01 to 20 (such as 0.01, 0.05, 0.1, 0.2, 0.3, 0.4, 0.5, 1, 2, 3, 4, 5, 8, 10, 12, 15, 18, or 20), optionally 0.2 to 8 or 0.5 to 5, and optionally A is the mass ratio of W2/W1, A being 0.1 to 10 (such as 0.1, 0.2, 0.3, 0.4, 0.5, 1, 2, 3, 4, 5, 6, 7, 8, 9, or 10), optionally 0.2 to 5. In a case that the amounts of the first additive and the second additive used satisfy the foregoing conditions, the second additive can be used to effectively alleviate the problem of the increase in the impedance of positive electrode caused by the first additive, and further optimize the improvement effect of the first additive on battery capacity and rate performance.

In some embodiments, the non-aqueous electrolyte further includes a third additive. The third additive includes one or more selected from a group consisting of a chain sulfate compound, a sulfite compound, a sultone compound containing an unsaturated bond, a disulfonic acid compound, a nitrile compound, an aromatic compound, an isocyanate compound, a phosphazene compound, a cyclic anhydride compound, a phosphite compound, a phosphate compound, and a borate compound. The third additive can improve the capacity and cycling performance of the secondary battery according to its own performance, and those skilled in the art can select a corresponding third additive according to actual needs.

In some embodiments, the non-aqueous electrolyte further includes an organic solvent. The organic solvent is not particularly limited in type and may be selected according to actual needs. Optionally, the organic solvent includes one or more selected from a group consisting of dimethyl carbonate, diethyl carbonate, dipropyl carbonate, ethyl methyl carbonate, methyl propyl carbonate, ethylene propyl carbonate, ethylene carbonate, propylene carbonate, butylene carbonate, gamma-butyrolactone, methyl formate, ethyl formate, methyl acetate, ethyl acetate, propyl acetate, methyl propionate, ethyl propionate, butyl propionate, and tetrahydrofuran.

In some embodiments, the non-aqueous electrolyte further includes an electrolytic salt. Optionally, the electrolytic salt includes one or more from a group consisting of $LiN(C_xF_{2x+1}SO_2)(C_yF_{2y+1}SO_2)$, $Li(FSO_2)_2N$, $LiCF_3SO_3$, $LiPF_6$, $LiBF_4$, $LiAsF_6$, $LiClO_4$, LiBOB, LiDFOB, and LiTFOP, x and y represent positive integers, optionally, x and y are each independently 0, 1, 2, or 3, and a concentration of the electrolytic salt in the non-aqueous electrolyte is in the range of 0.5 M-2 M, optionally 0.8 M-1.5 M, which can ensure the smooth and rapid migration of $Li^+$ in the positive and negative electrodes.

In some embodiments, based on a weight of the core, a coating amount of the first coating layer is C1% by weight, C1 being greater than 0 and less than or equal to 6, optionally greater than 0 and less than or equal to 5.5, or more optionally greater than 0 and less than or equal to 2; and/or based on the weight of the core, a coating amount of the second coating layer is C2% by weight, C2 being greater than 0 and less than or equal to 6, optionally greater than 0 and less than or equal to 5.5, or more optionally 2 to 4; and/or based on the weight of the core, a coating amount of the third coating layer is C3% by weight, C3 being greater than 0 and less than or equal to 6, optionally greater than 0 and less than or equal to 5.5, or more optionally greater than 0 and less than or equal to 2.

In the positive electrode active material with the core-shell structure in the foregoing embodiments, the coating amounts of the three coating layers are in some embodiments within the foregoing ranges, and therefore the core can be fully enveloped and the kinetic performance and the safety performance of the secondary battery can be further improved without reducing the gram capacity of the positive electrode active material.

In some embodiments, Q is defined as the ratio of W1/(C1+C2+C3), Q being 0.05 to 1 (such as 0.05, 0.06, 0.1, 0.2, 0.3, 0.4, 0.5, 0.6, 0.7, 0.8, 0.9, or 1), optionally 0.1 to 1. With the Q value controlled within the foregoing range, it is possible to avoid that insufficient polymers formed by the first additive on the coating layer cannot effectively inhibit the dissolution of manganese ions or reduce the decomposition of electrolyte due to catalysis and oxidation caused by the coated carbon in a case that the Q value is below the foregoing range, thereby resulting in insignificant improvements in high-temperature cycling and storage performance. However, in a case that the Q value exceeds the foregoing range, an excessive amount of the additive acting on the coating layer makes the impedance of the positive electrode excessively high, resulting in limited improvement of the gram capacity and rate performance of the battery.

In any embodiment, the crystalline pyrophosphate in the first coating layer has an interplanar spacing in the range of 0.293-0.470 nm and an included angle in the range of 18.00°-32.00° in the [111] crystal orientation; and the crystalline phosphate in the second coating layer has an interplanar spacing in the range of 0.244-0.425 nm and an included angle in the range of 20.00°-37.00° in the [111] crystal orientation. Both the first coating layer and the second coating layer in the positive electrode active material in the foregoing embodiments use crystalline substances, with the interplanar spacing and included angle thereof falling within the foregoing ranges. In this way, the impurity phase in the coating layer can be effectively avoided, thereby improving the gram capacity, cycling performance, and rate performance of the material.

In any embodiment, a ratio of y to 1−y in the core is in the range of 1:10 to 1:1, optionally 1:4 to 1:1. This further improves the cycling performance and rate performance of the secondary battery.

In any embodiment, a ratio of z to 1−z in the core is in the range of 1:999 to 1:9, optionally 1:499 to 1:249. This further improves the cycling performance and rate performance of the secondary battery.

In any embodiment, carbon in the third coating layer is a mixture of SP2 carbon and SP3 carbon; and optionally a molar ratio of SP2 carbon to SP3 carbon is any value in the range of 0.1-10, optionally any value in the range of 2.0-3.0. In the foregoing embodiments, with the molar ratio of SP2 carbon to SP3 carbon limited within the foregoing ranges, the overall performance of the secondary battery has been improved.

In any embodiment, a thickness of the first coating layer is 1 nm to 10 nm; and/or a thickness of the second coating layer is 2 nm to 15 nm; and/or a thickness of the third coating layer is 2 nm to 25 nm.

In the foregoing embodiments, in a case that the thickness of the first coating layer is in the range of 1-10 nm, the adverse effects on the kinetic performance of the material that may arise in a case that the coating layer is too thick can be avoided, and the problem that the migration of transition metal ions cannot be effectively hindered in a case that the coating layer is too thin can be avoided. In a case that the thickness of the second coating layer is in the range of 2-15 nm, the second coating layer has a stable surface structure and small side reactions with the electrolyte, such that the interface side reactions can be effectively mitigated, thereby improving the high-temperature performance of the secondary battery. In a case that the thickness of the third coating layer is in the range of 2-20 nm, the electrical conductivity of the material can be increased, and the compacted density performance of the battery electrode prepared using the positive electrode active material can be improved.

In any embodiment, based on the weight of the positive electrode active material with a core-shell structure, a percentage of element manganese is in the range of 10%-35% by weight, optionally in the range of 15%-30% by weight, and more optionally in the range of 17%-20% by weight; a percentage of element phosphorus is in the range of 12%-25% by weight, optionally in the range of 15%-20% by weight; and a weight ratio of element manganese to element phosphorus is in the range of 0.90-1.25, optionally 0.95-1.20.

In the positive electrode active material with a core-shell structure in the foregoing embodiments, with the percentage of element manganese within the foregoing ranges, problems such as poor material structure stability and density drop that may arise from excessive manganese content can be effectively avoided, thereby improving the performance of the secondary battery such as cycling, storage, and compacted density, and problems such as low voltage plateau that may arise from insufficient manganese content, thereby increasing the energy density of the secondary battery.

In the positive electrode active material with a core-shell structure in the foregoing embodiments, with the percentage of element phosphorus within the foregoing range, the following situations can be effectively avoided: A too-high percentage of element phosphorus may cause the covalency of P—O too strong and impair the conduction of small polarons, thereby impairing the conductivity of the material; or a too-low percentage of element phosphorus may reduce the stability of the lattice structure of the pyrophosphate in the first coating layer and/or the phosphate in the second coating layer, thereby impairing the stability of the material as a whole.

In the positive electrode active material with a core-shell structure in the foregoing embodiments, with the weight ratio of element manganese to element phosphorus within the foregoing ranges, the following situations can be effectively avoided: A too-large weight ratio may cause an increase in the dissolution of transition metal, impairing the stability of the material and the cycling and storage performance of the secondary battery; or a too-small weight ratio may reduce the discharge voltage plateau of the material, thereby reducing the energy density of the secondary battery.

In any embodiment, a lattice change rate of the positive electrode active material with a core-shell structure before and after complete lithium deintercalation or intercalation is lower than 4%, optionally lower than 3.8%, and more optionally is 2.0% to 3.8%. The positive electrode active material with a core-shell structure in the foregoing embodiments can achieve a lattice change rate lower than 4% before and after lithium deintercalation or intercalation. Therefore, the use of the positive electrode active material can improve the gram capacity and rate performance of the secondary battery.

In any embodiment, a Li/Mn antisite defect concentration of the positive electrode active material with a core-shell structure is lower than 4%, optionally lower than 2.2%, and more optionally is 1.5% to 2.2%. The Li/Mn antisite defect concentration within the foregoing ranges can avoid the hindrance of $Li^+$ transport by $Mn^{2+}$ and further improve the gram capacity and rate performance of the positive electrode active material.

In any embodiment, a compacted density of the positive electrode active material with a core-shell structure under 3 tons (T) is greater than 2.2 $g/cm^3$, optionally greater than 2.2 $g/cm^3$ and less than 2.8 $g/cm^3$. Therefore, increasing the compacted density increases the weight of the active material per unit volume, which is more conducive to increasing the volumetric energy density of the secondary battery.

In any embodiment, a valence state of surface oxygen of the positive electrode active material with a core-shell structure is lower than −1.90, and optionally is in the range of −1.90 to −1.98. Therefore, the valence state of surface oxygen of the positive electrode active material limited within the foregoing range can further mitigate the interface side reactions between the positive electrode material and the electrolyte, thereby improving the cycling performance, storage and gas generation under high temperature of the cell, and the like.

A second aspect of this application further provides a battery module. The battery module includes secondary batteries, the secondary battery being any one of the foregoing secondary batteries of this application.

A third aspect of this application further provides a battery pack. The battery pack includes battery modules, the battery module being the foregoing battery module of this application.

A fourth aspect of this application further provides an electric apparatus. The electric apparatus includes at least one of the secondary battery, the battery module, or the battery pack. All of the secondary battery, battery module, and battery pack are the secondary battery, battery module, and battery pack according to this application.

Thus, the battery module and battery pack of this application have relatively high cycling performance and rate characteristics, and especially have the high-temperature stability significantly improved, thereby providing relatively high power cycling stability and high-temperature operating stability for an electric apparatus with the secondary battery, battery module, or battery pack of this application.

Figure 1:
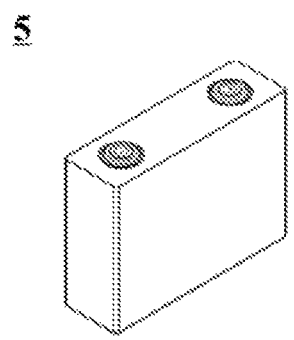
FIG. 1 is a schematic diagram of a secondary battery according to an embodiment of this application.

DESCRIPTION OF REFERENCE SIGNS 1. battery pack; 2. upper box body; 3. lower box body; 4. battery module; 5. secondary battery; 51. housing; 52. electrode assembly; and 53. top cover assembly.

DESCRIPTION OF EMBODIMENTS

The following specifically discloses embodiments of the secondary battery, battery module, battery pack, and electric apparatus of this application with appropriate reference to detailed descriptions of the accompanying drawings. However, there may be cases where unnecessary detailed descriptions are omitted. For example, detailed descriptions of well-known matters and repeated descriptions of actually identical structures have been omitted. This is to avoid unnecessarily prolonging the following description, for ease of understanding by persons skilled in the art. In addition, the accompanying drawings and the following descriptions are provided for persons skilled in the art to fully understand this application and are not intended to limit the subject matter recorded in the claims.

"Ranges" disclosed in this application are defined in the form of lower and upper limits. A given range is defined by one lower limit and one upper limit selected, where the selected lower and upper limits define boundaries of that particular range. Ranges defined in this method may or may not include end values, and any combinations may be used, meaning any lower limit may be combined with any upper limit to form a range. For example, if ranges of 60-120 and 80-110 are provided for a specific parameter, it is understood that ranges of 60-110 and 80-120 can also be envisioned. In addition, if minimum limit values of a range are given as 1 and 2, and maximum limit values of the range are given as 3, 4, and 5, the following ranges can all be envisioned: 1-3, 1-4, 1-5, 2-3, 2-4, and 2-5. In this application, unless otherwise stated, a value range of "a-b" is a short representation of any combination of real numbers between a and b, where both a and b are real numbers. For example, a value range of "0-5" means that all real numbers in the range of "0-5" are listed herein, and "0-5" is just a short representation of a combination of these values. In addition, a parameter expressed as an integer greater than or equal to 2 is equivalent to disclosure that the parameter is, for example, an integer among 2, 3, 4, 5, 6, 7, 8, 9, 10, 11, 12, and so on.

Unless otherwise specified, all the embodiments and optional embodiments of this application can be combined with each other to form new technical solutions.

Unless otherwise specified, all the technical features and optional technical features of this application can be combined with each other to form new technical solutions.

Unless otherwise specified, all the steps in this application can be performed sequentially or randomly, and in some embodiments, are performed sequentially. For example, a method including steps (a) and (b) indicates that the method may include steps (a) and (b) performed sequentially, or may include steps (b) and (a) performed sequentially. For example, the foregoing method may further include step (c), which indicates that step (c) may be added to the method in any ordinal position, for example, the method may include steps (a), (b), and (c), steps (a), (c), and (b), steps (c), (a), and (b), or the like.

Unless otherwise specified, "include" and "contain" mentioned in this application are non-exclusive. For example, the terms "include" and "contain" can mean that other unlisted components may or may not also be included or contained.

Unless otherwise specified, in this application, the term "or" is inclusive. For example, the phrase "A or B" means "A, B, or both A and B". More specifically, any one of the following conditions satisfies the condition "A or B": A is true (or present) and B is false (or not present); A is false (or not present) and B is true (or present); or both A and B are true (or present). In this disclosure, the phrases "at least one of A, B, and C" and "at least one of A, B, or C" both mean only A, only B, only C, or any combination of A, B, and C.

It should be noted that the term "coating layer" herein is a substance layer enveloped on the lithium manganese phosphate core, the substance layer can completely or partially envelope the lithium manganese phosphate core, and the use of "coating layer" is only for ease of description but not intended to limit the present disclosure. Similarly, the term "thickness of the coating layer" refers to a thickness of the substance layer enveloped on the lithium manganese phosphate core in a radial direction of the lithium manganese phosphate core.

The inventors of this application have found in actual operation that the lithium manganese phosphate positive electrode active material currently available suffers from relatively severe dissolution of manganese ions during deep charging and discharging. Although attempts have been made in the related art to envelop lithium manganese phosphate with lithium iron phosphate to reduce interface side reactions, such enveloping cannot prevent the manganese dissolved from continuing to migrate into the electrolyte. The manganese dissolved is reduced to metal manganese after migrating to a negative electrode. The metal manganese thus produced is equivalent to "catalyst", which can catalyze the decomposition of SEI (solid electrolyte interphase, solid electrolyte interphase) film on the surface of the negative electrode and produce by-products. A part of the by-products produced is gases that can cause the secondary battery swelling, impairing the safety performance of the secondary battery. In addition, another part of the by-products is deposited on surface of the negative electrode, hindering the channels of lithium ions in and out of the negative electrode, causing an increase in the impedance of the secondary battery, and thereby impairing the kinetic performance of the secondary battery. In addition, to supplement the lost SEI film, the electrolyte and the active lithium inside the battery are continuously consumed, which has irreversible effects on the capacity retention rate of the secondary battery.

The inventors of this application have found through extensive research that with lithium manganese phosphate modified and enveloped using multiple layers, a new type of positive electrode active material with a core-shell structure can be obtained. The positive electrode active material can achieve significantly reduced dissolution of manganese ions and reduced lattice change rate, can improve the cycling performance, rate performance, and safety performance of the battery and increase the capacity of the battery when used in secondary batteries.

[Secondary Battery]

The secondary battery, also referred to as a rechargeable battery or a storage battery, is a battery whose active material can be activated for continuous use through charging after the battery is discharged.

Generally, the secondary battery includes a positive electrode plate, a negative electrode plate, a separator, and an electrolyte. During charging and discharging of the battery, active ions (for example, lithium ions) are intercalated and deintercalated back and forth between the positive electrode plate and the negative electrode plate. The separator is sandwiched between the positive electrode plate and the negative electrode plate to mainly prevent short circuit between the positive and negative electrodes and allow active ions to pass through. The electrolyte is between the positive electrode plate and the negative electrode plate, playing a role of conducting active ions.

An embodiment of this application provides a secondary battery including a positive electrode plate and a non-aqueous electrolyte, where the positive electrode plate includes a positive electrode active material with a core-shell structure, and the positive electrode active material includes a core and a shell enveloping the core, where a chemical formula of the core being $Li_{1+x}Mn_{1-y}A_yP_{1-z}R_zO_4$, where x is any value in the range of −0.100 to 0.100, y is any value in the range of 0.001-0.500, z is any value in the range of 0.001-0.100, A is one or more elements selected from a group consisting of Zn, Al, Na, K, Mg, Mo, W, Ti, V, Zr, Fe, Ni, Co, Ga, Sn, Sb, Nb, and Ge, optionally one or more elements from Fe, Ti, V, Ni, Co, and Mg, R is one or more elements selected from a group consisting of B, Si, N, and S, optionally, R being one element selected from B, Si, N, and S, and values of x, y, and z satisfy the following condition: making the entire core electrically neutral; the shell including a first coating layer enveloping the core, a second coating layer enveloping the first coating layer, and a third coating layer enveloping the second coating layer, where the first coating layer includes a crystalline pyrophosphate $Li_aMP_2O_7$ and/or $M_b(P_2O_7)_c$, where 0≤a≤2, 1≤b≤4, 1≤c≤6, values of a, b, and c satisfy the following condition: making the crystalline pyrophosphate $Li_aMP_2O_7$ or $M_b(P_2O_7)_c$ electrically neutral, and each M in the crystalline pyrophosphate $Li_aMP_2O_7$ and $M_b(P_2O_7)_c$ is independently one or more elements selected from a group consisting of Fe, Ni, Mg, Co, Cu, Zn, Ti, Ag, Zr, Nb, and Al, the second coating layer includes a crystalline phosphate $XPO_4$, where X is one or more elements selected from a group consisting of Li, Fe, Ni, Mg, Co, Cu, Zn, Ti, Ag, Zr, Nb, and Al, and the third coating layer is carbon.

The non-aqueous electrolyte includes a first additive, the first additive including one or more from a group consisting of compounds shown in formula 1 and compounds shown in formula

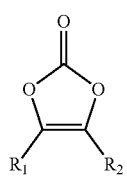

formula 1

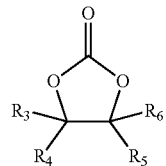

formula 2 where $R_1$ and $R_2$ each independently represent any one of a hydrogen atom, a halogen atom, a $C_1$-$C_6$ alkyl group, a $C_1$-$C_6$ haloalkyl group, a $C_1$-$C_6$ alkoxy group, a C2-C6 alkenyl group, or a C2-C6 alkynyl group; and $R_3$, $R_4$, $R_5$, and $R_6$ each independently represent any one of a hydrogen atom, a halogen atom, a $C_1$-$C_6$ alkyl group, a $C_1$-$C_6$ haloalkyl group, a $C_1$-$C_6$ alkoxy group, a C2-C6 alkenyl group, a C2-C6 alkynyl group, or a C2-C6 alkynyloxy group; and $R_3$, $R_4$, $R_5$, and $R_6$ do not all represent a hydrogen atom.

The positive electrode plate generally includes a positive electrode current collector and a positive electrode film layer provided on at least one surface of the positive electrode current collector, and the positive electrode film layer includes a positive electrode active material.

For example, the positive electrode current collector includes two back-to-back surfaces in a thickness direction of the positive electrode current collector, and the positive electrode film layer is disposed on either or both of the two back-to-back surfaces of the positive electrode current collector.

In some embodiments, the positive electrode current collector may be a metal foil current collector or a composite current collector. For example, an aluminum foil may be used as the metal foil. The composite current collector may include a polymer material matrix and a metal layer formed on at least one surface of the polymer material matrix. The composite current collector may be formed by forming a metal material (aluminum, aluminum alloy, nickel, nickel alloy, titanium, titanium alloy, silver, silver alloy, or the like) on a polymer material matrix (for example, matrices of polypropylene (PP), polyethylene terephthalate (PET), polybutylene terephthalate (PBT), polystyrene (PS), or polyethylene (PE)).

Unless otherwise specified, in the foregoing chemical formula of the core, when A is two or more elements, the foregoing limitation on the value range of y is not only a limitation on the stoichiometric number of each element as A but also a limitation on the sum of the stoichiometric numbers of all elements as A. For example, when A is two or more elements A1, A2, . . . , An, the stoichiometric numbers y1, y2, . . . , yn of all of A1, A2, . . . , An must fall within the value range defined by this application for y, and the sum of y1, y2, . . . , yn must also fall within the value range. Similarly, in a case that R is two or more elements, the limitation on the value range of the stoichiometric number of R in this application also has the foregoing meaning.

In an optional embodiment, when A is one, two, three, or four elements selected from Zn, Al, Na, K, Mg, Mo, W, Ti, V, Zr, Fe, Ni, Co, Ga, Sn, Sb, Nb, and Ge, $A_y$ is $Q_{n1}D_{n2}E_{n3}K_{n4}$, where n1+n2+n3+n4=y, n1, n2, n3, and n4 are positive and are not all zero at the same time, Q, D, E, K are each independently one selected from Zn, Al, Na, K, Mg, Mo, W, Ti, V, Zr, Fe, Ni, Co, Ga, Sn, Sb, Nb and Ge, and optionally, at least one of Q, D, E, and K is Fe. Optionally, one of n1, n2, n3, and n4 is zero and the rest is non-zero; more optionally, two of n1, n2, n3, and n4 are zero and the rest is non-zero; further optionally, three of n1, n2, n3, and n4 are zero and the rest is non-zero. In the core $Li_{1+x}Mn_{1-y}A_yP_{1-z}R_zO_4$, it is advantageous to dope one, two, three, or four of the foregoing element A at the manganese site, optionally, dope one, two, or three of the foregoing element A. Furthermore, it is advantageous to dope one or two of the element R at the phosphorus site, which facilitates a uniform distribution of the doping elements.

In the core $Li_{1+x}Mn_{1-y}A_yP_{1-z}R_zO_4$, the magnitude of x is affected by the magnitudes of valence states of A and R as well as the magnitudes of y and z to ensure that the entire system exhibits electrical neutrality. If the value of x is too small, the lithium content of the entire core system decreases, which impairs the extractable capacity per gram of the material. The y value may limit the total amount of all doping elements. A too-small y value, that is, an excessively low doping amount, makes the doping elements useless, and a y of more than 0.5 may lead to less Mn content in the system and impair the voltage plateau of the material. Element R doping occurs at P site. Because the P—O tetrahedron is relatively stable and a too-large z value may impair the stability of the material, the z value is limited in the range of 0.001-0.100.

The positive electrode active material in this application can improve the gram capacity, cycling performance, and safety performance of the secondary battery. Although the mechanism is still unclear, it is presumed that the lithium manganese phosphate positive electrode active material in this application is a core-shell structure. Doping element A and element R respectively on the manganese site and phosphorus site of the lithium manganese phosphate core can not only effectively reduce the amount of manganese ions dissolved, reduce the migration of manganese ions to the negative electrode, reduce the consumption of the electrolyte due to the decomposition of the SEI film, and improve the cycling performance and safety performance of the secondary battery, but also promote the adjustment of the Mn—O bond, reduce the migration barrier of lithium ions, promote the migration of lithium ions, and improve the rate performance of the secondary battery. The first coating layer that includes crystalline pyrophosphate and is enveloped on the core can further increase the migration resistance of manganese, reduce the amount of manganese dissolved, decrease the amount of impurity lithium on the surface, and reduce the contact between the core and the electrolyte, thereby reducing interface side reactions, reducing gas produced, and improving high-temperature storage performance, cycling performance, and safety performance of the secondary battery. Further, the enveloped crystalline phosphate coating layer with excellent ability to conduct lithium ions can effectively reduce the interface side reactions on the surface of the positive electrode active material, thus improving the high-temperature cycling and storage performance of the secondary battery. Furthermore, the carbon layer enveloped as the third coating layer can further improve the safety performance and kinetic performance of the secondary battery.

In addition, the element A doping at the manganese site of lithium manganese phosphate in the core helps to decrease the lattice change rate of lithium manganese phosphate during lithium deintercalation and intercalation, improve the structural stability of the lithium manganese phosphate positive electrode material, greatly reduce the dissolution of manganese, and reduce the oxygen activity on surface of particles. The element R doping at the phosphorus site also helps to change difficulty of change of Mn—O bond length, thereby improving the electronic conductivity, reducing the migration barrier of lithium ions, promoting the migration of lithium ions, and improving the rate performance of the secondary battery.

In addition, the entire core system is kept electrically neutral, which can ensure that there are as few defects and impurity phases as possible in the positive electrode active material. If excess transition metal (for example, manganese) is present in the positive electrode active material, the excess transition metal is likely to precipitate in the form of an elementary substance or form impurity phases inside the lattice because the material system itself has a relatively stable structure, so maintaining electrical neutrality helps minimize the presence of such impurity phases. In addition, ensuring the electrical neutrality of the system can also lead to lithium vacancies in the material in some cases, resulting in better kinetic performance of the material and then improving the kinetic performance of the secondary battery.

Moreover, a first additive is introduced into the non-aqueous electrolyte to form a polymer layer on the surface of the coating layer during charging of the lithium-ion battery. This prevents the dissolution of the coating layers, reduces the dissolution of manganese ions, lowers the catalytic activity of the coated carbon, and reduces active lithium consumption, thereby further improving the high-temperature cycling and storage performance of the secondary battery.

The positions of the main characteristic peaks in an XRD pattern of lithium manganese phosphate doped with element A and element R are the same as those of $LiMnPO_4$ without doping, indicating that the doping process do not introduce impurity phases. Therefore, the improvement on the performance of the core is mainly attributed to elemental doping rather than impurity phases. After the positive electrode active material is prepared, the inventors of this application cut out the middle region of the prepared positive electrode active material particles by focused ion beam (FIB for short). Tests conducted through transmission electron microscope (TEM for short) and X-ray energy spectrum analysis (EDS for short) show that the elements are uniformly distributed without aggregation.

In this application, the crystalline means that the crystallinity is higher than 50%, to be specific, 50% to 100%. A crystallinity lower than 50% is called glassy state. The crystallinity of the crystalline pyrophosphate and the crystalline phosphate in this application is in the range of 50% to 100%. The pyrophosphate and phosphate with enough crystallinity are not only conducive to fully utilizing the pyrophosphate coating layer to hinder the dissolution of manganese ions and the excellent ability of the phosphate coating layer to conduct lithium ions, reducing the interface side reactions, but also enable the pyrophosphate coating layer and the phosphate coating layer to be better lattice matched, such that a tighter binding between the coating layers can be achieved.

In this application, the crystallinity of the crystalline pyrophosphate in the first coating layer substance and the crystalline phosphate in the second coating layer substance in the positive electrode active material can be tested by using conventional technical means in the art, for example, a density, infrared spectroscopy, differential scanning calorimetry, and nuclear magnetic resonance absorption method, or for example, an X-ray diffraction method.

The specific X-ray diffraction method for testing the crystallinity of the crystalline pyrophosphate in the first coating layer and the crystalline phosphate in the second coating layer in the positive electrode active material may include the following steps:

taking a specific amount of the positive electrode active material powder, and measuring a total scattering intensity by X-ray, where the total scattering intensity is a sum of scattering intensities of substances in the entire space and is only related to the intensity of the primary rays, the chemical structure of the positive electrode active material powder, a total number of electrons participating in the diffraction, that is, the mass, and not to the order state of the sample; then separating crystalline scattering from non-crystalline scattering in a diffraction pattern, where the crystallinity is a ratio of an intensity of the crystalline scattering to the total scattering intensity.

It should be noted that in this application, the crystallinity of the pyrophosphate and phosphate in the coating layer can be adjusted, for example, by adjusting the process conditions of the sintering process, for example sintering temperature and sintering time.

In this application, metal ions are difficult to migrate in the pyrophosphate, and therefore the pyrophosphate, as the first coating layer, can effectively isolate doping metal ions from the electrolyte. The crystalline pyrophosphate has a stable structure, so coating with the crystalline pyrophosphate can effectively inhibit the dissolution of transition metals and improve the cycling performance.

The binding between the first coating layer and the core is similar to a heterojunction, and the firmness of the binding is limited by the degree of lattice match. In a case that the lattice mismatch is below 5%, the lattice match is good and the two are easily bound tightly. The tight binding can ensure that the coating layer does not detach from the core in the subsequent cycle process, which is beneficial to ensure the long-term stability of the material. The degree of binding between the first coating layer and the core is mainly measured by calculating the degree of mismatch between the core and each lattice constant of the coating. In this application, compared with the core doped with no elements, the core doped with elements A and R has an increased match with the first coating layer, and the core can be more tightly bound to the pyrophosphate coating layer.

The crystalline phosphate is selected as the second coating layer because, firstly, it has a better lattice match with the first coating layer crystalline pyrophosphate (the mismatch is only 3%), and secondly, the phosphate served as the second coating layer has better stability than the pyrophosphate. Therefore, using the phosphate for enveloping the pyrophosphate is beneficial to improve the stability of the material. The crystalline phosphate has a stable structure and excellent ability to conduct lithium ions. Therefore, using the crystalline phosphate for enveloping can effectively reduce the interface side reactions on the surface of the positive electrode active material, thereby improving the high-temperature cycling and storage performance of the secondary battery. The lattice match between the second coating layer and the first coating layer is, for example, similar to the binding between the first coating layer and the core. In a case that the lattice mismatch is below 5%, the lattice match is good, and the second coating layer and the first coating layer are easily bound tightly.

The main reason for selected carbon as the third coating layer is that the carbon layer has better electronic conductivity. Because the electrochemical reactions of carbon applied in secondary batteries require the participation of electrons, to promote the electron transport between particles and the electron transport at different positions on the particles, carbon with excellent electrical conductivity can be used for enveloping the positive electrode active material. Carbon enveloping can effectively improve the electrical conductivity and desolvation of the positive electrode active material.

The coating layers in this application may be used for fully coating or partial coating.

The compound of the foregoing formula 1 is selected from common formula 1 compounds in the related art. In some embodiments, $R_1$ and $R_2$ each independently represent any one of a hydrogen atom, a halogen atom, a C1-C4 alkyl group, a C1-C4 haloalkyl group, a C1-C4 alkoxy group, a C2-C4 alkenyl group, or a C2-C4 alkynyl group, and optionally, $R_1$ and $R_2$ each independently represent any one of a hydrogen atom, a halogen atom, a C1-C4 alkyl group, a C1-C2 haloalkyl group, or a C2-C3 alkenyl group.

The compound of the foregoing formula 2 is selected from common formula 2 compounds in the related art. In some embodiments, $R_3$, $R_4$, $R_5$, and $R_6$ each independently represent any one of a hydrogen atom, a halogen atom, a C1-C4 alkyl group, a C1-C4 haloalkyl group, a C1-C4 alkoxy group, a C2-C4 alkenyl group, a C2-C4 alkynyl group, or a C2-C4 alkynyloxy group, optionally, $R_3$, $R_4$, $R_5$, and $R_6$ each independently represent any one of a hydrogen atom, a halogen atom, a C1-C3 alkyl group, a C1-C2 haloalkyl group, a C1-C4 alkoxy group, a C2-C4 alkenyl group, or a C2-C4 alkynyloxy group, and $R_3$, $R_4$, $R_5$, and $R_6$ do not all represent a hydrogen atom.

Further, in some embodiments, the first additive includes at least one of the following compounds:

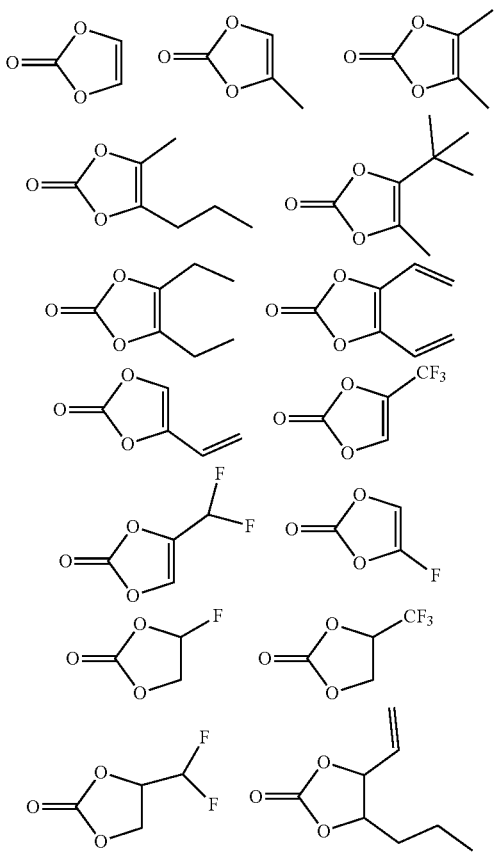

-continued

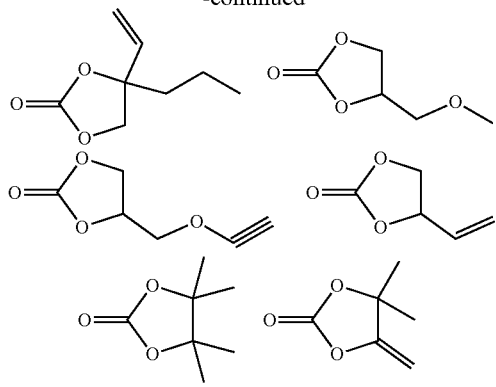

In some embodiments, based on a total weight of the non-aqueous electrolyte, a percentage of the first additive is W1% by weight, W1 being 0.01 to 20, optionally 0.2 to 8 or 0.5 to 5. The mass percentage of the first additive in the electrolyte within the foregoing range can prevent the coating layers of pyrophosphate and phosphate from being dissolved, lower the catalytic activity of the coated carbon, and also avoid an increase in the impedance of the positive electrode, thereby further improving the high-temperature cycling and storage performance of the secondary battery without impairing the capacity and rate performance of the secondary battery.

In some embodiments, the first additive is any one of the following compounds:

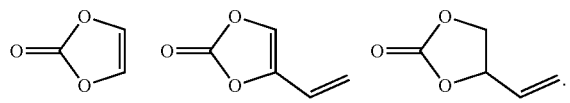

The polymers formed by the first additives above are more stable during the charging process, thus improving the dissolution of Mn in the positive electrode active material of this application more efficiently.

In some embodiments, the non-aqueous electrolyte further includes a second additive. The second additive includes one or more from a group consisting of ethylene sulfate, lithium difluorophosphate, lithium difluorooxalate phosphate, and lithium difluorooxalate borate. Each of the foregoing second additives can be used to generate a film on the positive electrode to form a low-resistance CEI film (cathode electrolyte interface film), further improving the capacity and rate performance of the secondary battery.

In some embodiments, based on the total weight of the non-aqueous electrolyte, a percentage of the second additive is W2% by weight, W2 being 0.01 to 20, optionally 0.2 to 8 or 0.3 to 5, so as to form a low-impedance CEI film with an appropriate thickness.

In some embodiments, based on a total weight of the non-aqueous electrolyte, a percentage of the first additive is W1% by weight, W1 being 0.01 to 20, optionally 0.2 to 8 or 0.5 to 5, and optionally A is the mass ratio of W2/W1, A being 0.1 to 10, optionally 0.2 to 5. In a case that the amounts of the first additive and the second additive used satisfy the foregoing conditions, the second additive can be used to effectively alleviate the problem of the increase in the impedance of positive electrode caused by the first additive, and further optimize the improvement effect of the first additive on battery capacity and rate performance.

In some embodiments, the non-aqueous electrolyte further includes a third additive. The third additive includes one or more selected from a group consisting of a chain sulfate compound, a sulfite compound, a sultone compound containing an unsaturated bond, a disulfonic acid compound, a nitrile compound, an aromatic compound, an isocyanate compound, a phosphazene compound, a cyclic anhydride compound, a phosphite compound, a phosphate compound, and a borate compound. The third additive can improve the capacity and cycling performance of the secondary battery according to its own performance, and those skilled in the art can select a corresponding third additive according to actual needs.

In some embodiments, the non-aqueous electrolyte further includes an organic solvent. The organic solvent is not particularly limited in type and may be selected according to actual needs. Optionally, the organic solvent includes one or more selected from a group consisting of dimethyl carbonate, diethyl carbonate, dipropyl carbonate, ethyl methyl carbonate, methyl propyl carbonate, ethylene propyl carbonate, ethylene carbonate, propylene carbonate, butylene carbonate, gamma-butyrolactone, methyl formate, ethyl formate, methyl acetate, ethyl acetate, propyl acetate, methyl propionate, ethyl propionate, butyl propionate, and tetrahydrofuran.

In some embodiments, the non-aqueous electrolyte further includes an electrolytic salt. Optionally, the electrolytic salt includes one or more from a group consisting of $LiN(C_xF_{2x+1}SO_2)(C_yF_{2y+1}SO_2)$, $Li(FSO_2)_2N$, $LiCF_3SO_3$, $LiPF_6$, $LiBF_4$, $LiAsF_6$, $LiClO_4$, LiBOB, LiDFOB, and LiTFOP, x and y represent positive integers, optionally, x and y are each independently 0, 1, 2, or 3, and a concentration of the electrolytic salt in the non-aqueous electrolyte is in the range of 0.5 M-2 M, optionally 0.8 M-1.5 M, which can ensure the smooth and rapid migration of $Li^+$ in the positive and negative electrodes.

In some embodiments, based on a weight of the core, a coating amount of the first coating layer is C1% by weight, C1 being greater than 0 and less than or equal to 6, optionally greater than 0 and less than or equal to 5.5, or more optionally greater than 0 and less than or equal to 2; and/or based on the weight of the core, a coating amount of the second coating layer is C2% by weight, C2 being greater than 0 and less than or equal to 6, optionally greater than 0 and less than or equal to 5.5, or more optionally 2 to 4; and/or based on the weight of the core, a coating amount of the third coating layer is C3% by weight, C3 being greater than 0 and less than or equal to 6, optionally greater than 0 and less than or equal to 5.5, or more optionally greater than 0 and less than or equal to 2.

In this application, the coating amount of each layer is not zero.

In the positive electrode active material with the core-shell structure in the foregoing embodiments, the coating amounts of the three coating layers are in some embodiments within the foregoing ranges, and therefore the core can be fully enveloped and the kinetic performance and the safety performance of the secondary battery can be further improved without reducing the gram capacity of the positive electrode active material.

For the first coating layer, with the coating amount within the foregoing range, the following situations can be avoided: a too-small coating amount means that the coating layer is relatively thin and may not be able to effectively hinder the migration of transition metals; and a too-large coating amount means that the coating layer is too thick and may impair the migration of Li+, thereby impairing the rate performance of the material.

For the second coating layer, with the coating amount within the foregoing range, the following situations can be avoided: a too-large coating amount may impair the overall plateau voltage of the material; and a too-small coating amount may not achieve sufficient coating effect.

For the third coating layer, the carbon coating mainly promotes the electron transport between the particles. However, because the structure also contains a large amount of amorphous carbon, the density of carbon is low. The compacted density of the electrode plate may be impaired if the coating amount is too large.

In the positive electrode active material with the core-shell structure in the foregoing embodiments, the coating amounts of the three coating layers are in some embodiments within the foregoing ranges, and therefore the core can be fully enveloped and the kinetic performance and the safety performance of the secondary battery can be further improved without reducing the gram capacity of the positive electrode active material.

In some embodiments, Q is defined as the ratio of W1/(C1+C2+C3), Q being 0.05 to 1 (such as 0.05, 0.1, 0.2, 0.3, 0.4, 0.5, 0.6, 0.7, 0.8, 0.9, or 1), optionally 0.1 to 1. With the Q value controlled within the foregoing range, it is possible to avoid that in a case that the Q value is below the foregoing range, no sufficient amount of the first additive is guaranteed to act on the coating layer, effects of inhibiting the dissolution of manganese ions and reducing the decomposition of electrolyte due to catalysis and oxidation caused by the coated carbon are insignificant, and then high-temperature cycling and storage performance cannot be significantly improved. However, in a case that the Q value exceeds the foregoing range, an excessive amount of the additive acting on the coating layer makes the impedance of the positive electrode excessively high, impairing the improvement of the gram capacity and rate performance of the lithium-ion battery.

In any embodiment, the crystalline pyrophosphate in the first coating layer has an interplanar spacing in the range of 0.293-0.470 nm and an included angle in the range of 18.00°-32.00° in the [111] crystal orientation; and the crystalline phosphate in the second coating layer has an interplanar spacing in the range of 0.244-0.425 nm and an included angle in the range of 20.00°-37.00° in the [111] crystal orientation.

The crystalline pyrophosphate and crystalline phosphate in the coating layers may be characterized by means of conventional technologies in the art, or may be characterized, for example, by means of transmission electron microscopy (TEM). Under the TEM, the core and the coating layer can be distinguished by measuring the interplanar spacing.

The specific method of measuring the interplanar spacing and included angle of the crystalline pyrophosphate and crystalline phosphate in the coating layers may include the following steps:

taking a specific amount of coated positive electrode active material sample powder in a test tube, injecting the test tube with a solvent such as alcohol, and stirring and dispersing the mixture thoroughly; then taking an appropriate amount of the resulting solution with a clean disposable plastic pipette, and dropping the solution on a 300-mesh copper grid, part of the powder remaining on the copper grid at this point; and transferring the copper grid together with the sample to the TEM sample cavity for testing, obtaining an original picture under the TEM test, and saving the original picture.

The original picture obtained from the TEM test is opened in the diffractometer software, and Fourier transform is performed to obtain a diffraction pattern. A distance from a diffracted spot to the center of the diffraction pattern is measured to obtain the interplanar spacing, and the included angle is calculated according to the Bragg equation.

The interplanar spacing range of the crystalline pyrophosphate is different from that of the crystalline phosphate, which can be directly determined from values of the interplanar spacing.

Both the first coating layer and the second coating layer in the positive electrode active material in the foregoing embodiments use crystalline substances, with the interplanar spacing and included angle thereof falling within the foregoing ranges. In this way, the impurity phase in the coating layer can be effectively avoided, thereby improving the gram capacity, cycling performance, and rate performance of the material. The crystalline pyrophosphate and crystalline phosphate having the interplanar spacing and included angle in the foregoing ranges can more effectively inhibit the lattice change rate and dissolution of manganese ions of the lithium manganese phosphate during lithium deintercalation and intercalation, thereby enhancing the high-temperature cycling performance, cycling stability, and high-temperature storage performance of the secondary battery.

In some embodiments, a ratio of y to 1−y in the core is in the range of 1:10 to 1:1, optionally 1:4 to 1:1. The energy density and cycling performance of the secondary battery using the positive electrode active material can be further improved when the foregoing conditions are satisfied.

In some embodiments, a ratio of z to 1−z in the core is in the range of 1:9 to 1:999, optionally 1:499 to 1:249. Herein, z denotes the sum of the stoichiometric numbers of element R doping at P site. The energy density and cycling performance of the secondary battery using the positive electrode active material can be further improved when the foregoing conditions are satisfied.

In some embodiments, carbon in the third coating layer is a mixture of SP2 carbon and SP3 carbon; and optionally a molar ratio of SP2 carbon to SP3 carbon is any value in the range of 0.1-10, optionally any value in the range of 2.0-3.0.

In some embodiments, a molar ratio of SP2 carbon to SP3 carbon may be about 0.1, about 0.2, about 03, about 0.4, about 0.5, about 0.6, about 0.7, about 0.8, about 0.9, about 1, about 2, about 3, about 4, about 5, about 6, about 7, about 8, about 9, or about 10, or in any range of any of these values.

In this application, an "about" value indicates a range of ±10% of that value.

By selecting the morphology of carbon in the carbon coating layer, the overall electrical performance of the secondary battery can be improved. Specifically, with a mixture used of SP2 carbon and SP3 carbon and the ratio of SP2 carbon to SP3 carbon limited within a specified range, the following situations can be avoided: If the carbon in coating layers is entirely in the form of amorphous SP3, the conductivity is poor; and if the carbon in coating layers is entirely in the form of graphitized SP2, the conductivity is good, but there are few pathways for lithium ion, which is not conducive to lithium deintercalation. In addition, with the molar ratio of SP2 carbon to SP3 carbon limited within the foregoing range, good electrical conductivity can be achieved and the channels of lithium ions can be ensured, so it is beneficial to optimizing functions of the secondary battery and improving the cycling performance of the secondary battery.

The mixing ratio of SP2 carbon to SP3 carbon of the third coating layer can be controlled by sintering conditions such as sintering temperature and sintering time. For example, under the condition that sucrose is used as the source of carbon to prepare the third coating layer, the sucrose is deposited on the second coating layer after pyrolysis at high temperature, and under the action of high temperature, a carbon coating layer with both SP3 carbon and SP2 carbon is produced. The ratio of SP2 carbon to SP3 carbon can be controlled by selecting the pyrolysis and sintering conditions.

The structure and characteristics of the third coating layer carbon can be measured by Raman (Raman) spectroscopy, and the specific measurement method is as follows: splitting the energy spectrum of the Raman test to obtain Id/Ig (where Id is a peak intensity of SP3 carbon and Ig is a peak intensity of SP2 carbon), and then determining the molar ratio therebetween.

In some embodiments, a thickness of the first coating layer is 1 nm to 10 nm; and/or a thickness of the second coating layer is 2 nm to 15 nm; and/or a thickness of the third coating layer is 2 nm to 25 nm.

In some embodiments, the thickness of the first coating layer may be about 2 nm, about 3 nm, about 4 nm, about 5 nm, about 6 nm, about 7 nm, about 8 nm, about 9 nm, or about 10 nm, or in any range of any of these values.

In some embodiments, the thickness of the second coating layer may be about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm or about 15 nm, or in any range of any of these values.

In some embodiments, the thickness of the third coating layer may be about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, about 21 nm, about 22 nm, about 23 nm, about 24 nm, or about 25 nm, or in any range of any of these values.

In a case that the thickness of the first coating layer is in the range of 1-10 nm, the adverse effects on the kinetic performance of the material that may arise in a case that the coating layer is too thick can be avoided, and the problem that the migration of transition metal ions may not be effectively hindered in a case that the coating layer is too thin can be avoided.

In a case that the thickness of the second coating layer is in the range of 2-15 nm, the second coating layer has a stable surface structure and small side reactions with the electrolyte, such that the interface side reactions can be effectively mitigated, thereby further improving the high-temperature performance of the secondary battery.

In a case that the thickness of the third coating layer is in the range of 2-25 nm, the electrical conductivity of the material can be further increased, and the compacted density performance of the battery electrode prepared using the positive electrode active material can be better improved.

The thickness of the coating layer is measured mainly by FIB, and the specific method can include the following steps: randomly selecting a single particle from the positive electrode active material powder to be tested, cutting a thin slice with a thickness of about 100 nm from the middle of the selected particle or near the middle, and performing TEM test on the thin slice to measure the thickness of the coating layer where the measurement is performed for 3 to 5 positions and an average value is taken.

In some embodiments, based on the weight of the positive electrode active material, a percentage of element manganese is in the range of 10%-35% by weight, optionally in the range of 15%-30% by weight, and more optionally in the range of 17%-20% by weight; a percentage of element phosphorus is in the range of 12%-25% by weight, optionally in the range of 15%-20% by weight; and a weight ratio of element manganese to element phosphorus is in the range of 0.90-1.25, optionally 0.95-1.20.

In this application, under the condition that only the core of the positive electrode active material contains manganese, the manganese content may correspond to the core content.

In the foregoing embodiments, with the percentage of element manganese limited within the foregoing range, problems such as poor material structure stability and density drop that may arise from excessive manganese content can be effectively avoided, thereby effectively improving the performance of the secondary battery such as cycling, storage, and compacted density, and problems such as low voltage plateau that may arise from insufficient manganese content, thereby further increasing the energy density of the secondary battery.

In the foregoing embodiments, with the percentage of element phosphorus limited within the foregoing range, the following situations can be effectively avoided: A too-high percentage of element phosphorus may cause the covalency of P—O too strong and impair the conduction of small polarons, thereby impairing the conductivity of the material; and a too-low percentage of phosphorus may reduce the stability of the lattice structure of the core, the pyrophosphate in the first coating layer and/or the phosphate in the second coating layer, thereby impairing the stability of the material as a whole.

The weight ratio of manganese to phosphorus has the following effects on the performance of the secondary battery: A too-large weight ratio indicates an excessive amount of element manganese and an increased dissolution of manganese ions, which impairs the stability and extractable capacity per gram of the positive electrode active material, and thereby impairs the cycling performance and storage capacity of the secondary battery; and a too-small weight ratio indicates an excessive amount of element phosphorus so that it is prone to forming impurity phases, which may reduce the discharge voltage plateau of the material, thereby reducing the energy density of the secondary battery.

The measurement of element manganese and element phosphorus can be performed by means of conventional technologies in the art. In particular, the following method is used to determine the amounts of element manganese and element phosphorus: dissolving the material in a dilute hydrochloric acid (with a concentration of 10% to 30%), measuring the amount of each element in the solution using ICP, and then performing measurement and conversion for the amount of element manganese to obtain its percentage by weight.

In some embodiments, a lattice change rate of the positive electrode active material with a core-shell structure before and after complete lithium deintercalation or intercalation is lower than 4%, optionally lower than 3.8%, and more optionally is 2.0% to 3.8%.

The processes of lithium deintercalation and intercalation of lithium manganese phosphate ($LiMnPO_4$) are two-phase reactions. The interface stress of the two phases is determined by the magnitude of the lattice change rate before and after lithium deintercalation or intercalation, where a smaller lattice change rate indicates a lower interface stress and easier Li$^+$ transport. Therefore, reducing the lattice change rate of the core is beneficial to increase the Li$^+$ transport capacity, thereby improving the rate performance of the secondary battery. The positive electrode active material with a core-shell structure in the foregoing embodiments can achieve a lattice change rate lower than 4% before and after lithium deintercalation or intercalation, so the use of the positive electrode active material can improve the rate performance of the secondary battery. The lattice change rate can be measured by a method known in the art, such as X-ray diffraction mapping (XRD).

In some embodiments, a Li/Mn antisite defect concentration of the positive electrode active material with a core-shell structure is lower than 4%, optionally lower than 2.2%, and more optionally is 1.5% to 2.2%.

The Li/Mn antisite defect in this application refers to the interchange of the sites of Li$^+$ and Mn$^{2+}$ in the LiMnPO$_4$ lattice. Accordingly, the Li/Mn antisite defect concentration refers to a percentage of Li$^+$ interchanged with Mn$^{2+}$ in the total amount of Li$^+$. In this application, the Li/Mn antisite defect concentration can be measured, for example, according to JIS K 0131-1996.

The positive electrode active material with a core-shell structure in the foregoing embodiments can achieve the foregoing low Li/Mn antisite defect concentration. Although the mechanism has not been understood yet, the inventors of this application speculate that because the sites of Li$^+$ and Mn$^{2+}$ in the LiMnPO$_4$ lattice are interchanged and the Li$^+$ transport channel is a one-dimensional channel, Mn$^{2+}$ in the Li$^+$ channel is difficult to migrate and then hinders the transport of Li$^+$. Therefore, the positive electrode active material with a core-shell structure of this application can avoid the hindrance of Li$^+$ transport by Mn$^{2+}$ due to the low Li/Mn antisite defect concentration, which is in the foregoing range, and increase the extractable capacity per gram and rate performance of the positive electrode active material.

In some embodiments, a compacted density of the positive electrode active material under 3 T is greater than 2.2 g/cm$^3$, optionally greater than 2.2 g/cm$^3$ and less than 2.8 g/cm$^3$. A higher compacted density indicates a large weight of the active material per unit volume. Therefore, increasing the compacted density is conducive to increasing the volumetric energy density of the cell. The compacted density can be measured according to GB/T 24533-2009.

In some embodiments, a valence state of surface oxygen of the positive electrode active material is lower than −1.90, and optionally is in the range of −1.90 to −1.98.

The stable valence state of oxygen is originally −2. The valence state closer to −2 indicates a stronger electron accepting ability, in other words, a higher oxidability. Typically, the surface valence state of oxygen is below −1.7. In the foregoing embodiments, the valence state of surface oxygen of the positive electrode active material limited in the foregoing ranges can mitigate the interface side reactions between the positive electrode material and the electrolyte, thereby improving the cycling performance, storage and gas generation under high temperature of the cell, and the like.

The valence state of surface oxygen can be measured by a method known in the art, such as electron energy loss spectroscopy (EELS).

This application further provides a preparation method of positive electrode active material, including the following steps:
a step of providing a core material, a chemical formula of the core being Li$_{1+x}$Mn$_{1-y}$A$_y$P$_{1-z}$R$_z$O$_4$, where x is any value in the range of −0.100 to 0.100, y is any value in the range of 0.001-0.500, z is any value in the range of 0.001-0.100, A is one or more elements selected from Zn, Al, Na, K, Mg, Mo, W, Ti, V, Zr, Fe, Ni, Co, Ga, Sn, Sb, Nb, and Ge, optionally one or more elements of Fe, Ti, V, Ni, Co, and Mg, and R is one or more selected from B, Si, N, and S, optionally R being one element selected from B, Si, N, and S; and a coating step: respectively providing Li$_a$MP$_2$O$_7$ and/or M$_b$(P$_2$O$_7$)$_c$ and XPO$_4$ suspensions, and adding and mixing the core material into the foregoing suspensions for sintering, to obtain a positive electrode active material, where 0≤a≤2, 1≤b≤4, 1≤c≤6, and values of a, b, and c satisfy the following condition: making the crystalline pyrophosphate Li$_a$MP$_2$O$_7$ or M$_b$(P$_2$O$_7$)$_c$ electrically neutral; M is each independently one or more elements selected from Fe, Ni, Mg, Co, Cu, Zn, Ti, Ag, Zr, Nb, or Al; and X is one or more elements selected from Li, Fe, Ni, Mg, Co, Cu, Zn, Ti, Ag, Zr, Nb, or Al;

where the positive electrode active material has a core-shell structure including the core and a shell enveloping the core, the shell including the first coating layer enveloping the core, a second coating layer enveloping the first coating layer, and a third coating layer enveloping the second coating layer, where the first coating layer includes a crystalline pyrophosphate Li$_a$MP$_2$O$_7$ and/or M$_b$(P$_2$O$_7$)$_c$, the second coating layer includes a crystalline phosphate XPO$_4$, and the third coating layer is carbon.

In some embodiments, the step of providing a core material includes the following steps:
Step (1): mixing and stirring a manganese source, a dopant of element A, and an acid in a container to obtain element A-doped manganese salt particles; and
Step (2): mixing the element A-doped manganese salt particles, a lithium source, a phosphorus source, and a dopant of element R in a solvent to obtain a slurry, and sintering the slurry under the protection of an inert gas atmosphere to obtain a core doped with element A and element R, where the core doped with element A and element R is Li$_{1+x}$Mn$_{1-y}$A$_y$P$_{1-z}$R$_z$O$_4$, where x is any value in the range of −0.100 to 0.100, y is any value in the range of 0.001-0.500, z is any value in the range of 0.001-0.100, A is one or more elements selected from Zn, Al, Na, K, Mg, Mo, W, Ti, V, Zr, Fe, Ni, Co, Ga, Sn, Sb, Nb, and Ge, optionally one or more elements of Fe, Ti, V, Ni, Co, and Mg, and R is one or more selected from B, Si, N, and S, optionally R being one element selected from B, Si, N, and S.

The sources of the materials are not particularly limited in the preparation method in this application, and the source of an element may include one or more of elementary substance, sulfates, halides, nitrates, organic acid salts, oxides, or hydroxides of the element, provided that the source can achieve the objectives of the preparation method in this application.

In some embodiments, the dopant of element A is one or more selected from respective elementary substance, carbonates, sulfates, chlorides, nitrates, organic acid salts, oxides, and hydroxides of one or more elements of Zn, Al, Na, K, Mg, Mo, W, Ti, V, Zr, Fe, Ni, Co, Ga, Sn, Sb, Nb, and Ge.

In some embodiments, the dopant of element R is one or more selected from respective inorganic acids, subacids, organic acids, sulfates, chlorides, nitrates, organic acid salts, oxides, and hydroxides of one or more elements of B, Si, N, and S.

In this application, the manganese source is a manganese-containing substance known in the art that can be used to prepare lithium manganese phosphate. For example, the manganese source may be one or more selected from elementary manganese, manganese dioxide, manganese phosphate, manganese oxalate, and manganese carbonate.

In this application, the acid may be one or more selected from inorganic acids such as hydrochloric acid, sulfuric acid, nitric acid, phosphoric acid, silicic acid, metasilicic acid, and organic acids such as oxalic acid. In some embodiments, the acid is a dilute organic acid with a concentration lower than 60% by weight.

In this application, the lithium source may be a lithium-containing substance known in the art that can be used to prepare lithium manganese phosphate. For example, the lithium source is one or more selected from lithium carbonate, lithium hydroxide, lithium phosphate, and lithium dihydrogen phosphate.

In this application, the phosphorus source may be a phosphorus-containing substance known in the art that can be used to prepare lithium manganese phosphate. For example, the phosphorus source is one or more selected from diammonium hydrogen phosphate, diammonium dihydrogen phosphate, ammonium phosphate, and phosphoric acid.

In some optional embodiments, after the manganese source, the dopant of element A, and the acid react in the solvent to obtain a manganese salt suspension doped with element A, the suspension is filtered, dried, and subjected to sand milling to obtain element A-doped manganese salt particles with a particle size of 50-200 nm.

In some optional embodiments, the slurry in the step (2) is dried to obtain a powder, and then the powder is sintered to obtain the core doped with element A and element R.

In some embodiments, the mixing in the step (1) is carried out at a temperature of 20-120° C., optionally 40-120° C.; and/or
the stirring in the step (1) is carried out at 400 rpm to 700 rpm for 1-9 hours, optionally for 3-7 hours.

Optionally, the reaction in the step (1) may be carried out at a temperature of about 30° C., about 50° C., about 60° C., about 70° C., about 80° C., about 90° C., about 100° C., about 110° C., or about 120° C.; the stirring in the step (1) is carried out for about 2 hours, about 3 hours, about 4 hours, about 5 hours, about 6 hours, about 7 hours, about 8 hours, or about 9 hours; and optionally, the reaction temperature and stirring time in the step (1) may be within any range defined by any of the foregoing values.

In some embodiments, the mixing in the step (2) is carried out at a temperature of 20-120° C., optionally 40-120° C., for 1-12 hours. Optionally, the reaction in the step (2) may be carried out at a temperature of about 30° C., about 50° C., about 60° C., about 70° C., about 80° C., about 90° C., about 100° C., about 110° C., or about 120° C.; the stirring in the step (2) is carried out for about 2 hours, about 3 hours, about 4 hours, about 5 hours, about 6 hours, about 7 hours, about 8 hours, about 9 hours, about 10 hours, about 11 hours, or about 12 hours; and optionally, the reaction temperature and mixing time in the step (2) may be within any range defined by any of the foregoing values.

In a case that the temperature and time during the preparation of core particles are within the foregoing ranges, the cores obtained from the preparation and the positive electrode active material made therefrom have fewer lattice defects, which is conducive to inhibiting the dissolution of manganese ions and reducing the interface side reactions between the positive electrode active material and the electrolyte, thereby improving the cycling performance and safety performance of the secondary battery.

In some embodiments, optionally, during the preparation of the dilute manganese acid particles doped with elements A and R, the solution pH is controlled to be 3.5 to 6; optionally, the solution pH is controlled to be 4 to 6; and more optionally, the solution pH is controlled to be 4 to 5. It should be noted that the pH of the resulting mixture may be adjusted in this application by a method commonly used in the art, for example, the addition of an acid or alkali.

In some embodiments, optionally, a molar ratio of the manganese salt particles, the lithium source, and the phosphorus source in the step (2) is 1:0.5-2.1:0.5-2.1, and more optionally, a molar ratio of the element A-doped manganese salt particles, the lithium source, and the phosphorus source is about 1:1:1.

In some embodiments, optionally, the sintering conditions during preparation of lithium manganese phosphate doped with element A and element R are: sintering in an atmosphere of an inert gas or a mixture of an inert gas and hydrogen at 600-950° C. for 4-10 hours. Optionally, the sintering may be carried out at about 650° C., about 700° C., about 750° C., about 800° C., about 850° C., or about 900° C. for about 2 hours, about 3 hours, about 4 hours, about 5 hours, about 6 hours, about 7 hours, about 8 hours, about 9 hours, or about 10 hours. Optionally, the sintering temperature and sintering time may be within any range defined by any of the foregoing values. During preparation of lithium manganese phosphate doped with element A and element R, a too-low sintering temperature and a too-short sintering time result in lower crystallinity of the core of the material, impairing the overall performance, a too-high sintering temperature can lead to impurity phases in the core of the material, impairing the overall performance, and a too-long sintering time results in larger core particles of the material, impairing the extractable capacity per gram, compacted density, rate performance, and the like.

In some optional embodiments, optionally, the protective atmosphere is a mixed gas of 70% to 90% nitrogen by volume and 10% to 30% hydrogen by volume.

In some embodiments, the coating step includes:
a first coating step: dissolving a source of element M, a phosphorus source, an acid, and optionally a lithium source in a solvent to obtain a first coating layer suspension; mixing well the core obtained in the core step and the first coating layer suspension obtained in the first coating step, followed by drying and sintering, to obtain a material enveloped by the first coating layer;
a second coating step: dissolving a source of element X, a phosphorus source, and an acid in a solvent to obtain a second coating layer suspension; mixing well the material enveloped by the first coating layer obtained in the first coating step and the second coating layer suspension obtained in the second coating step, followed by drying and sintering, to obtain a material enveloped by two coating layers; and
a third coating step: dissolving a carbon source in a solvent to obtain a solution for the third coating layer after full dissolution; then adding the materials enveloped by two coating layers obtained in the second coating step to the solution for the third coating layer, and mixing them to uniformity, followed by drying and sintering, to obtain a material enveloped by three coating layers, that is, a positive electrode active material.

In some embodiments, the source of element M is one or more selected from respective elementary substance, carbonates, sulfates, chlorides, nitrates, organic acid salts, oxides, and hydroxides of one or more elements of Fe, Ni, Mg, Co, Cu, Zn, Ti, Ag, Zr, Nb, and Al.

In some embodiments, the source of element X is one or more selected from respective elementary substance, carbonates, sulfates, chlorides, nitrates, organic acid salts, oxides, and hydroxides of one or more elements of Li, Fe, Ni, Mg, Co, Cu, Zn, Ti, Ag, Zr, Nb, and Al.

The amount of elements A, R, M, and X added from the respective sources depends on a target doping amount, and the ratio of amounts of the lithium, manganese, and phosphorus sources conforms to the stoichiometric ratio.

For example, the source of carbon is one or more selected from starch, sucrose, glucose, polyvinyl alcohol, polyethylene glycol, and citric acid.

In some embodiments, in the first coating step, the solution in which the source of element M, the phosphorus source, the acid, and optionally the lithium source are dissolved is controlled to have a pH of 3.5 to 6.5, stirred and reacted for 1-5 h, then the temperature of the solution is raised to 50-120° C. and maintained for 2-10 hours, and/or the sintering is carried out at 650-800° C. for 2-6 hours.

Optionally, in the first coating step, the reaction proceeds thoroughly. Optionally, in the first coating step, the reaction is performed for about 1.5 hours, about 2 hours, about 3 hours, about 4 hours, about 4.5 hours, or about 5 hours. Optionally, in the first coating step, the reaction time of the reaction may be within any range defined by any of the foregoing values.

Optionally, in the first coating step, the solution PH is controlled to be 4-6. Optionally, in the first coating step, the temperature of the solution is raised to about 55° C., about 60° C., about 70° C., about 80° C., about 90° C., about 100° C., about 110° C., or about 120° C., and maintained at that temperature for about 2 hours, about 3 hours, about 4 hours, about 5 hours, about 6 hours, about 7 hours, about 8 hours, about 9 hours, or about 10 hours. Optionally, in the first coating step, the raised temperature and maintaining time may be within any range defined by any of the foregoing values.

Optionally, in the first coating step, the sintering is carried out at about 650° C., about 700° C., about 750° C., or about 800° C. for about 2 hours, about 3 hours, about 4 hours, about 5 hours, or about 6 hours. Optionally, the sintering temperature and sintering time may be within any range defined by any of the foregoing values.

In the first coating step, with the sintering temperature and sintering time controlled within the foregoing ranges, the following situations can be avoided: A too-low sintering temperature and a too-short sintering time in the first coating step result in low crystallinity of the first coating layer with more amorphous substances, which can lead to a decrease in the effect of inhibiting the dissolution of metal, thereby impairing the cycling performance and high-temperature storage performance of the secondary battery; a too-high sintering temperature can lead to impurity phases in the first coating layer, which also impairs the effect of inhibiting the dissolution of metal, thereby impairing the cycling and high-temperature storage performance of the secondary battery; and a too-long sintering time results in an increase in thickness of the first coating layer, impairing the migration of $Li^+$ and thereby impairing the extractable capacity per gram, rate performance, and the like of the material.

In some embodiments, in the second coating step, the source of element X, the phosphorus source, and the acid are dissolved in the solvent. A resulting mixture is stirred and reacted for 1-10 hours, then the temperature of the solution is raised to 60-150° C. and maintained for 2-10 hours, and/or the sintering is carried out at 500-700° C. for 6-10 hours.

Optionally, in the second coating step, the reaction proceeds thoroughly. Optionally, in the second coating step, the reaction is performed for about 1.5 hours, about 2 hours, about 3 hours, about 4 hours, about 4.5 hours, about 5 hours, about 6 hours, about 7 hours, about 8 hours, about 9 hours, or about 10 hours. Optionally, in the second coating step, the reaction time of the reaction may be within any range defined by any of the foregoing values.

Optionally, in the second coating step, the temperature of the solution is raised to about 65° C., about 70° C., about 80° C., about 90° C., about 100° C., about 110° C., about 120° C., about 130° C., about 140° C., or about 150° C., and maintained at that temperature for about 2 hours, about 3 hours, about 4 hours, about 5 hours, about 6 hours, about 7 hours, about 8 hours, about 9 hours, or about 10 hours. Optionally, in the second coating step, the raised temperature and maintaining time may be within any range defined by any of the foregoing values.

In the step of providing a core material, the first coating step, and the second coating step, before the sintering, that is, during the preparation of the chemically reacted core material (steps (1) and (2)) and the preparation of the first coating layer suspension and the second coating layer suspension, selecting the appropriate reaction temperature and reaction time as described above can avoid the following situations: In a case that the reaction temperature is too low, the reaction cannot occur or the reaction rate is slow; in a case that the temperature is too high, the product is decomposed or forms impurity phases; in a case that the reaction time is too long, the product particle size is large, which may increase the time and difficulty in subsequent processes; and in a case that the reaction time is too short, the reaction is incomplete and fewer products are obtained.

Optionally, in the second coating step, the sintering is carried out at about 550° C., about 600° C., or about 700° C. for about 6 hours, about 7 hours, about 8 hours, about 9 hours, or about 10 hours. Optionally, the sintering temperature and sintering time may be within any range defined by any of the foregoing values.

In the second coating step, with the sintering temperature and sintering time controlled within the foregoing ranges, the following situations can be avoided: A too-low sintering temperature and a too-short sintering time in the second coating step result in low crystallinity of the second coating layer with more amorphous substances, which decreases the performance of reducing the reactivity of the material surface, thereby impairing the cycling and high-temperature storage performance of the secondary battery; a too-high sintering temperature can lead to impurity phases in the second coating layer, which also impairs the effect of reducing the reactivity of the material surface, thereby impairing the cycling and high-temperature storage performance of the secondary battery; and a too-long sintering time results in an increase in thickness of the second coating layer, impairing the voltage plateau of the material and thereby reducing the energy density of the material, and the like.

In some embodiments, the sintering in the third coating step is carried out at 700° C.-800° C. for 6-10 hours.

Optionally, in the third coating step, the sintering is carried out at about 700° C., about 750° C., or about 800° C. for about 6 hours, about 7 hours, about 8 hours, about 9 hours, or about 10 hours. Optionally, the sintering temperature and sintering time may be within any range defined by any of the foregoing values.

In the third coating step, with the sintering temperature and sintering time controlled within the foregoing ranges, the following situations can be avoided: A too-low sintering temperature in the third coating step results in an decrease in the degree of graphitization of the third coating layer, impairing its electrical conductivity and thereby impairing the extractable capacity per gram of the material; a too-high sintering temperature can cause the degree of graphitization of the third coating layer to be too high, impairing the transport of $Li^+$ and thereby impairing the extractable capacity per gram of the material; a too-short sintering time can cause the coating layer to be too thin, impairing its electrical conductivity and thereby impairing the extractable capacity per gram of the material; and a too-long sintering time can cause the coating layer to be too thick, impairing the compacted density of the material, and the like.

In the first coating step, the second coating step, and the third coating step described above, the drying is all carried out at 100° C. to 200° C., optionally at 110° C. to 190° C., more optionally at 120° C. to 180° C., further more optionally 120° C. to 170° C., and most optionally 120° C. to 160° C., with a drying time of 3-9 hours, optionally 4-8 hours, more optionally 5-7 hours, and most optionally about 6 hours.

With the positive electrode active material prepared by using the preparation method of positive electrode active material in this application, the secondary battery prepared by using the positive electrode active material reduces the amounts of Mn and doping elements at the Mn site dissolved after cycling and improves high-temperature stability, high-temperature cycling performance, and rate performance. In addition, the raw materials have a variety of sources and low cost, and the process is simple, which is conducive to the realization of industrialization. In any embodiment, a valence state of surface oxygen of the positive electrode active material with a core-shell structure is lower than −1.90, and optionally is in the range of −1.90 to −1.98. Therefore, the valence state of surface oxygen of the positive electrode active material limited within the foregoing range can further mitigate the interface side reactions between the positive electrode material and the electrolyte, thereby improving the cycling performance, storage and gas generation under high temperature of the cell, and the like. In some embodiments, the positive electrode film layer may further include other positive electrode active materials well-known in the art and used for secondary batteries. For example, the positive electrode active material may include at least one of the following materials: olivine-structured lithium-containing phosphate, lithium transition metal oxide, and respective modified compounds thereof. However, this application is not limited to such materials, and may alternatively use other conventional well-known materials that can be used as positive electrode active materials for secondary batteries. One of these positive electrode active materials may be used alone, or two or more of them may be used in combination. Examples of the lithium transition metal oxide may include but are not limited to at least one of lithium nickel oxide (such as $LiNiO_2$), lithium manganese oxide (such as $LiMnO_2$ and $LiMn_2O_4$), lithium nickel cobalt oxide, lithium manganese cobalt oxide, lithium nickel manganese oxide, and their modified compounds.

Examples of the olivine-structured lithium-containing phosphate may include but are not limited to at least one of lithium iron phosphate (for example, $LiFePO_4$ (or LFP for short)), composite materials of lithium iron phosphate and carbon, lithium manganese phosphate (for example, $LiMnPO_4$), composite materials of lithium manganese phosphate and carbon, lithium manganese iron phosphate, and composite materials of lithium manganese iron phosphate and carbon.

In some embodiments, the positive electrode film layer further optionally includes a binder. For example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylic resin.

In some embodiments, the positive electrode film layer further optionally includes a conductive agent. For example, the conductive agent may include at least one of superconducting carbon, acetylene black, carbon black, Ketjen black, carbon dots, carbon nanotubes, graphene, and carbon nanofibers.

In some embodiments, the positive electrode plate may be prepared in the following manner: the foregoing constituents used for preparing the positive electrode plate, for example, the positive electrode active material, the conductive agent, the binder, and any other constituent, are dispersed in a solvent (for example, N-methylpyrrolidone) to form a positive electrode slurry; and the positive electrode slurry is applied onto the positive electrode current collector, followed by processes such as drying and cold pressing to obtain the positive electrode plate.

[Negative Electrode Plate]

The negative electrode plate includes a negative electrode current collector and a negative electrode film layer disposed on at least one surface of the negative electrode current collector, where the negative electrode film layer includes a negative electrode active material.

For example, the negative electrode current collector includes two opposite surfaces in its thickness direction, and the negative electrode film layer is disposed on either or both of the two opposite surfaces of the negative electrode current collector.

In some embodiments, the negative electrode current collector may be a metal foil current collector or a composite current collector. For example, for the metal foil, a copper foil may be used. The composite current collector may include a polymer material matrix and a metal layer formed on at least one surface of the polymer material matrix. The composite current collector may be formed by forming a metal material (copper, copper alloy, nickel, nickel alloy, titanium, titanium alloy, silver, silver alloy, or the like) on a polymer material matrix (for example, matrices of polypropylene (PP), polyethylene terephthalate (PET), polybutylene terephthalate (PBT), polystyrene (PS), and polyethylene (PE)).

In some embodiments, the negative electrode active material may be a negative electrode active material well-known in the art and used for batteries. For example, the negative electrode active material may include at least one of the following materials: artificial graphite, natural graphite, soft carbon, hard carbon, a silicon-based material, a tin-based material, and lithium titanate. The silicon-based material may be selected from at least one of elementary silicon, silicon-oxygen compounds, silicon-carbon composites, silicon-nitrogen composites, and silicon alloys. The tin-based material may be selected from at least one of elementary tin, tin-oxygen compound, or tin alloy. However, this application is not limited to these materials, but may use other conventional materials that can be used as negative electrode active materials for batteries instead. One type of these negative electrode active materials may be used alone, or two or more types may be used in combination.

In some embodiments, the negative electrode film layer further optionally includes a binder. For example, the binder may be selected from at least one of styrene-butadiene rubber (SBR), polyacrylic acid (PAA), polyacrylic acid sodium (PAAS), polyacrylamide (PAM), polyvinyl alcohol (PVA), sodium alginate (SA), polymethacrylic acid (PMAA), or carboxymethyl chitosan (CMCS).

In some embodiments, the negative electrode film layer further optionally includes a conductive agent. For example, the conductive agent may be at least one selected from superconducting carbon, acetylene black, carbon black, Ketjen black, carbon dots, carbon nanotubes, graphene, and carbon nanofibers.

In some embodiments, the negative electrode film layer may further optionally include other adjuvants such as a thickener (for example, sodium carboxymethyl cellulose (CMC-Na)).

In some embodiments, the negative electrode plate may be prepared in the following manner: The constituents used for preparing the negative electrode plate, for example, the negative electrode active material, the conductive agent, the binder, and any other constituents, are dispersed in a solvent (for example, deionized water) to form a negative electrode slurry; and the negative electrode slurry is applied onto the negative electrode current collector, followed by processes such as drying and cold pressing, to obtain the negative electrode plate.

[Separator]

In some embodiments, the secondary battery further includes a separator. The separator is not limited to any particular type in this application, and may be any well-known porous separator with good chemical stability and mechanical stability.

In some embodiments, a material of the separator may be selected from at least one of glass fiber, non-woven fabric, polyethylene, polypropylene, and polyvinylidene fluoride. The separator may be a single-layer film or a multi-layer composite film, and is not particularly limited. In a case that the separator is a multi-layer composite film, all layers may be made of same or different materials, which is not particularly limited.

In some embodiments, the positive electrode plate, the negative electrode plate, and the separator may be made into an electrode assembly through winding or stacking.

In some embodiments, the secondary battery may include an outer package. The outer package may be used for packaging the electrode assembly and the electrolyte.

In some embodiments, the outer package of the secondary battery may be a hard shell, for example, a hard plastic shell, an aluminum shell, or a steel shell. The outer package of the secondary battery may alternatively be a soft package, for example, a soft pouch. Material of the soft package may be plastic, which, for example, may be polypropylene, polybutylene terephthalate, and polybutylene succinate.

This application does not impose any special limitations on a shape of the secondary battery, and the secondary battery may be cylindrical, rectangular, or of any other shapes. For example, FIG. 1 shows a secondary battery 5 of a rectangular structure as an example.

Figure 2:
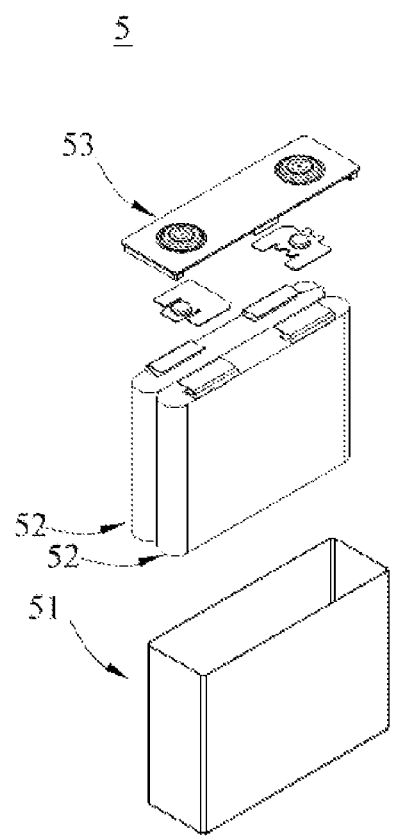
FIG. 2 is an exploded view of the secondary battery according to the embodiment of this application in FIG. 1.

In some embodiments, referring to FIG. 2, the outer package may include a housing 51 and a cover plate 53. The housing 51 may include a base plate and a side plate connected onto the base plate, and the base plate and the side plate enclose an accommodating cavity. The housing 51 has an opening communicating with the accommodating cavity, and the cover plate 53 can cover the opening to close the accommodating cavity. The positive electrode plate, the negative electrode plate, and the separator may be made into an electrode assembly 52 through winding or stacking. The electrode assembly 52 is packaged in the accommodating cavity. The electrolyte infiltrates the electrode assembly 52. There may be one or more electrode assemblies 52 in the secondary battery 5, and persons skilled in the art may make choices according to specific actual requirements.

In some embodiments, the secondary battery may be assembled into a battery module, and the battery module may include one or more secondary batteries. The specific quantity may be chosen by persons skilled in the art according to use and capacity of the battery module.

Figure 3:
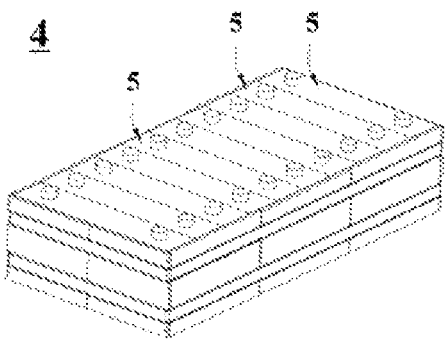
FIG. 3 is a schematic diagram of a battery module according to an embodiment of this application.

FIG. 3 shows a battery module 4 as an example. Referring to FIG. 3, in the battery module 4, a plurality of secondary batteries 5 may be sequentially arranged in a length direction of the battery module 4. Certainly, the secondary batteries 5 may alternatively be arranged in any other manner. Further, the plurality of secondary batteries 5 may be fastened by using fasteners.

Optionally, the battery module 4 may further include a housing with an accommodating space, and the plurality of secondary batteries 5 are accommodated in the accommodating space.

In some embodiments, the battery module may be further assembled into a battery pack, and the battery pack may include one or more battery modules. The specific quantity may be chosen by persons skilled in the art according to use and capacity of the battery pack.

Figure 4:
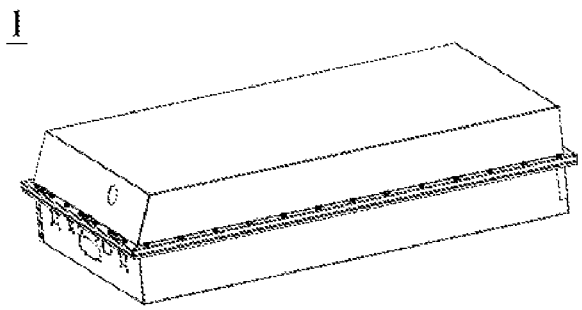
FIG. 4 is a schematic diagram of a battery pack according to an embodiment of this application.
Figure 5:
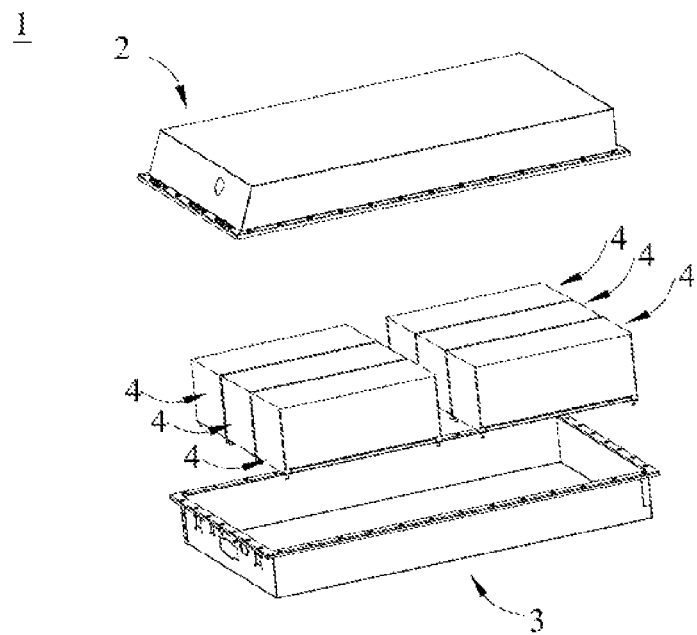
FIG. 5 is an exploded view of the battery pack according to the embodiment of this application in FIG. 4.

FIG. 4 and FIG. 5 show a battery pack 1 used as an example. Referring to FIG. 4 and FIG. 5, the battery pack 1 may include a battery box and a plurality of battery modules 4 arranged in the battery box. The battery box includes an upper box body 2 and a lower box body 3. The upper box body 2 can cover the lower box body 3 to form an enclosed space for accommodating the battery modules 4. The plurality of battery modules 4 may be arranged in the battery box in any manner.

In addition, this application further provides an electric apparatus. The electric apparatus includes at least one of the secondary battery, the battery module, or the battery pack provided in this application. The secondary battery, the battery module, or the battery pack may be used as a power source for the electric apparatus or an energy storage unit of the electric apparatus. The electric apparatus may include a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite system, an energy storage system, and the like, but is not limited thereto.

The secondary battery, the battery module, or the battery pack may be selected for the electric apparatus based on requirements for using the electric apparatus.

Figure 6:
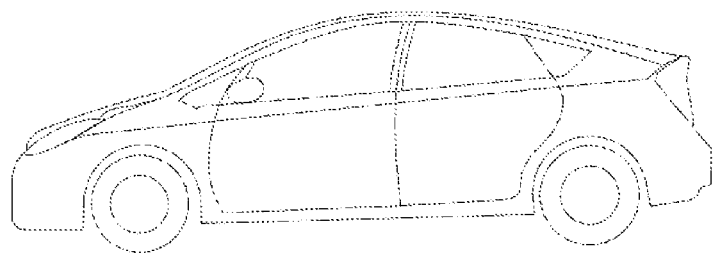
FIG. 6 is a schematic diagram of an electric apparatus using a secondary battery as a power source according to an embodiment of this application.

FIG. 6 shows an electric apparatus as an example. The electric apparatus is a battery electric vehicle, a hybrid electric vehicle, a plug-in hybrid electric vehicle, or the like. To satisfy a requirement of the electric apparatus for high power and high energy density of the secondary battery, a battery pack or a battery module may be used.

Examples

The following describes examples of this application. The examples described below are illustrative and only used for explaining this application, and cannot be construed as limitations on this application. Examples whose technical solutions or conditions are not specified are made in accordance with technical solutions or conditions described in literature in the field or made in accordance with product instructions. The reagents or instruments used are all conventional products that are commercially available if no manufacturer is indicated.

The first additive is selected from the following compounds:

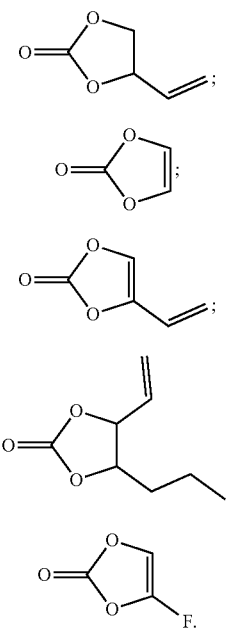

compound 1 compound 2 compound 3 compound 4 compound 5

I. Preparation of Battery

Example 1

Step 1: Preparation of Positive Electrode Active Material
Step S1: Preparation of Fe, Co, V, and S Co-Doped Manganese Oxalate 689.6 g of manganese carbonate, 455.27 g of ferrous carbonate, 4.65 g of cobalt sulfate, and 4.87 g of vanadium dichloride were added into a mixer and mixed well for 6 hours. A resulting mixture was transferred into a reactor, with addition of 5 L of deionized water and 1260.6 g of oxalic acid dihydrate. The reactor was heated to 80° C., and the materials were stirred thoroughly at 500 rpm for 6 hours and mixed well until the reaction was terminated without bubbles to obtain a Fe, Co, and V co-doped manganese oxalate suspension. The suspension was filtered, dried at 120° C., and then sanded to obtain manganese oxalate particles with a particle size of 100 nm.
Step S2: Preparation of Core $Li_{0.997}Mn_{0.60}Fe_{0.393}V_{0.004}Co_{0.003}P_{0.997}S_{0.003}O_4$ 1793.1 g of manganese oxalate prepared in the step S1, 368.3 g of lithium carbonate, 1146.6 g of ammonium dihydrogen phosphate, and 4.9 g of dilute sulfuric acid were added into 20 L of deionized water. A resulting mixture was stirred thoroughly, evenly mixed and reacted at 80° C. for 10 hours to obtain a slurry. The slurry was transferred to a spray drying equipment for spray drying and granulation at 250° C. to obtain a powder. The powder was sintered in a roller kiln for 4 hours at 700° C. in a protective atmosphere (90% nitrogen and 10% hydrogen) to obtain the foregoing core material.
Step S3: Preparation of First Coating Layer Suspension Preparation of $Li_2FeP_2O_7$ solution: 7.4 g of lithium carbonate, 11.6 g of ferrous carbonate, 23.0 g of ammonium dihydrogen phosphate, and 12.6 g of oxalic acid dihydrate were dissolved in 500 mL of deionized water, during which a resulting mixture was controlled to have a pH value of 5; the resulting mixture was stirred and reacted at room temperature for 2 hours to obtain a solution; and then the solution was heated to 80° C. and left standing at this temperature for 4 hours to obtain a first coating layer suspension.
Step S4: Application of First Coating Layer 1571.9 g of doped lithium manganese phosphate core material obtained in the step S2 was added to the first coating layer suspension (having a coating substance of 15.7 g) obtained in the step S3, and the mixture was fully mixed and stirred for 6 hours. After well mixing, a resulting mixture was transferred to an oven for drying at 120° C. for 6 hours, and then sintered at 650° C. for 6 hours to obtain a pyrophosphate-coated material.
Step S5: Preparation of Second Coating Layer Suspension 3.7 g of lithium carbonate, 11.6 g of ferrous carbonate, 11.5 g of ammonium dihydrogen phosphate, and 12.6 g of oxalic acid dihydrate were dissolved in 1500 mL of deionized water. A resulting mixture was stirred and reacted for 6 hours to obtain a solution; and then the solution was heated to 120° C. and maintained at this temperature for 6 hours to obtain a second coating layer suspension.
Step S6: Application of Second Coating Layer 1586.8 g of pyrophosphate-coated material obtained in the step S4 was added to the second coating layer suspension (having a coating substance of 47.1 g) obtained in the step S5, and a resulting mixture was stirred thoroughly and mixed for 6 hours. After well mixing, the resulting mixture was transferred to an oven for drying at 120° C. for 6 hours, and then sintered at 700° C. for 8 hours to obtain a two-layer-coated material.
Step S7: Preparation of Third Coating Layer Aqueous Solution 37.3 g of sucrose was dissolved in 500 g of deionized water, and then the mixture was stirred and fully dissolved to obtain an aqueous sucrose solution.
Step S8: Application of Third Coating Layer 1633.9 g of the two-layer-coated material obtained in the step S6 was added into the sucrose solution obtained in the step S7. A resulting mixture was stirred and mixed for 6 hours. After well mixing, the resulting mixture was transferred to an oven for drying at 150° C. for 6 hours, and then sintered at 700° C. for 10 hours to obtain a three-layer-coated material.
Step 2: Preparation of Positive Electrode Plate The prepared three-layer-coated positive electrode active material, a conductive agent acetylene black, and a binder polyvinylidene fluoride (PVDF) were added at a weight ratio of 97.0:1.2:1.8 to N-methylpyrrolidone (NMP), stirred and mixed to uniformity to obtain a positive electrode slurry.

Then the positive electrode slurry was uniformly applied on an aluminum foil at 0.280 g/1540.25 mm$^2$, followed by drying, cold pressing, and slitting, to obtain a positive electrode plate.

Step 3: Preparation of Negative Electrode Plate

Negative electrode active material artificial graphite, hard carbon, conductive agent acetylene black, binder styrene-butadiene rubber (SBR), thickener sodium carboxymethyl cellulose (CMC) were dissolved at a weight ratio of 90:5:2:2:1 in solvent deionized water, and a resulting mixture was stirred and mixed well, to obtain a negative electrode slurry. The negative electrode slurry was uniformly applied onto a negative electrode current collector copper foil at 0.117 g/1540.25 mm$^2$, followed by drying, cold pressing, and slitting, to obtain a negative electrode plate.

Step 4: Preparation of Electrolyte

In an argon atmosphere glove box (H$_2$O<0.1 ppm, O$_2$<0.1 ppm), ethylene carbonate (EC) and ethyl methyl carbonate (EMC) as organic solvents were mixed well at a volume ratio of 3:7, and added with compound 1 (as a first additive, with a mass percentage of 2% in the electrolyte), lithium difluorophosphate (as a second additive, with a mass percentage of 1% in the electrolyte), and LiPF$_6$ (as an electrolytic salt, with a mass percentage of 1% in the electrolyte). A resulting mixture was stirred well to obtain an electrolyte.

Step 5: Preparation of Separator

A commercially available PP-PE copolymer microporous film with a thickness of 20 μm and an average pore diameter of 80 nm (from Advanced Electronic Technology Co., Ltd, model 20) was used.

Step 6: Preparation of Full Battery

The positive electrode plate, separator, and negative electrode plate obtained above were stacked in order, so that the separator was placed between the positive and negative electrodes for separation, and winding was performed to obtain a jelly roll. The jelly roll was placed in an outer package, the electrolyte was injected, and the outer package was sealed to obtain a full battery (also referred to as "full cell" hereinafter).

[Preparation of Button Battery]

The prepared positive electrode active material, polyvinylidene fluoride (PVDF), and acetylene black were added at a weight ratio of 90:5:5 to N-methylpyrrolidone (NMP) and stirred in a drying room to obtain a slurry. The slurry was applied onto an aluminum foil, followed by drying and cold pressing, to obtain a positive electrode plate. The coating amount was 0.2 g/cm$^2$ and the compacted density was 2.0 g/cm$^3$.

A lithium sheet used as the negative electrode, a solution used as the electrolyte and containing ethylene carbonate (EC), diethyl carbonate (DEC), and dimethyl carbonate (DMC) at a volume ratio of 1:1:1 with compound 1 (as a first additive, with a mass percentage of 2% in the electrolyte), lithium difluorophosphate (as a second additive, with a mass percentage of 1% in the electrolyte), and LiPF$_6$ (as an electrolytic salt, with a mass percentage of 1% in the electrolyte), and the prepared positive electrode plate were assembled together in a button cell box to form a button battery (also referred to as "button cell" hereafter).

Examples 2 to 29 and Comparative Examples 1 to 3

The positive electrode active materials and batteries of Examples 2 to 29 and Comparative examples 1 to 3 were made in methods similar to that of Example 1, and the differences in the preparation of the positive electrode active materials are shown in Tables 1-6, where in Comparative examples 2 and 3 without the first layer coated, the steps S3 and S4 were not performed; and in Comparative example 1 without the second layer coated, the steps S5 and S6 were not performed.

Note: In all examples and comparative examples of this application, if not indicated, the first coating layer substance and/or the second coating layer substance used are assumed to be crystalline by default.

TABLE 1

| Raw materials for preparation of core | | | |
|---|---|---|---|
| No. | Core | Raw materials used in step S1 | Raw materials used in step S2 |
| Comparative example 1 | LiMn$_{0.80}$Fe$_{0.20}$PO$_4$ | Manganese carbonate, 919.4 g; ferrous carbonate, 231.7 g; water, 5 L; and oxalic acid dihydrate, 1260.6 g | Ferromanganese oxalate dihydrate (in terms of C$_2$O$_4$Mn$_{0.80}$Fe$_{0.20}$•2H$_2$O) obtained in step S1, 1791.4 g; lithium carbonate, 369.4 g; ammonium dihydrogen phosphate 1150.1 g; and water, 20 L |
| Comparative example 2 | LiMn$_{0.70}$Fe$_{0.295}$V$_{0.005}$PO$_4$ | Manganese carbonate, 804.5 g; ferrous carbonate, 341.8 g; vanadium dichloride, 6.1 g; water, 5 L; and oxalic acid dihydrate, 1260.6 g | Ferromanganese vanadium oxalate dihydrate (in terms of C$_2$O$_4$Mn$_{0.70}$Fe$_{0.295}$V$_{0.005}$•2H$_2$O) obtained in step S1, 1792.0 g; lithium carbonate, 369.4 g; ammonium dihydrogen phosphate, 1150.1 g; and water, 20 L |
| Comparative example 3 | Li$_{0.997}$Mn$_{0.60}$Fe$_{0.393}$V$_{0.004}$Co$_{0.003}$P$_{0.997}$S$_{0.003}$O$_4$ | Manganese carbonate, 689.6 g; ferrous carbonate, 455.3 g; cobalt sulfate, 4.7 g; vanadium dichloride, 4.9 g; water, 5 L; and oxalic acid dihydrate, 1260.6 g | Ferromanganese vanadium cobalt oxalate dihydrate (in terms of C$_2$O$_4$Mn$_{0.60}$Fe$_{0.393}$V$_{0.004}$Co$_{0.003}$•2H$_2$O) obtained in step S1, 1793.1 g; lithium carbonate, 368.3 g; ammonium dihydrogen phosphate, 1146.6 g; dilute sulfuric acid, 4.9 g; and water, 20 L |

TABLE 1-continued

| | | Raw materials for preparation of core | |
|---|---|---|---|
| No. | Core | Raw materials used in step S1 | Raw materials used in step S2 |
| Example 11 | $Li_{1.001}Mn_{0.60}Fe_{0.393}V_{0.004}Co_{0.003}P_{0.999}Si_{0.001}O_4$ | Manganese carbonate, 689.6 g; ferrous carbonate, 455.3 g; cobalt sulfate, 4.7 g; vanadium dichloride, 4.9 g; water, 5 L; and oxalic acid dihydrate, 1260.6 g | Ferromanganese vanadium cobalt oxalate dihydrate (in terms of $C_2O_4Mn_{0.60}Fe_{0.393}V_{0.004}Co_{0.003} \cdot 2H_2O$) obtained in step S1, 1793.1 g; lithium carbonate, 369.8 g; ammonium dihydrogen phosphate, 1148.9 g; metasilicic acid, 0.8 g; and water, 20 L |
| Example 12 | $LiMn_{0.60}Fe_{0.393}V_{0.004}Co_{0.003}P_{0.998}N_{0.002}O_4$ | Manganese carbonate, 689.6 g; ferrous carbonate, 455.3 g; cobalt sulfate, 4.7 g; vanadium dichloride, 4.9 g; water, 5 L; and oxalic acid dihydrate, 1260.6 g | Ferromanganese vanadium cobalt oxalate dihydrate (in terms of $C_2O_4Mn_{0.60}Fe_{0.393}V_{0.004}Co_{0.003} \cdot 2H_2O$) obtained in step S1, 1793.1 g; lithium carbonate, 369.4 g; ammonium dihydrogen phosphate, 1147.8 g; dilute nitric acid, 2.7 g; and water, 20 L |
| Example 13 | $Li_{0.995}Mn_{0.65}Fe_{0.341}V_{0.004}Co_{0.005}P_{0.995}S_{0.005}O_4$ | Manganese carbonate, 747.1 g; ferrous carbonate, 395.1 g; cobalt sulfate, 7.8 g; vanadium dichloride, 4.9 g; water, 5 L; oxalic acid dihydrate, 1260.6 g; | Ferromanganese vanadium cobalt oxalate dihydrate (in terms of $C_2O_4Mn_{0.65}Fe_{0.341}V_{0.004}Co_{0.005} \cdot 2H_2O$) obtained in step S1, 1792.7 g; lithium carbonate, 367.6 g; ammonium dihydrogen phosphate, 1144.3 g; dilute sulfuric acid, 8.2 g; and water, 20 L |
| Example 14 | $Li_{1.002}Mn_{0.70}Fe_{0.293}V_{0.004}Co_{0.003}P_{0.998}Si_{0.002}O_4$ | Manganese carbonate, 804.6 g; ferrous carbonate, 339.5 g; cobalt sulfate, 4.7 g; vanadium dichloride, 4.9 g; water, 5 L; and oxalic acid dihydrate, 1260.6 g | Ferromanganese vanadium cobalt oxalate dihydrate (in terms of $C_2O_4Mn_{0.70}Fe_{0.293}V_{0.004}Co_{0.003} \cdot 2H_2O$) obtained in step S1, 1792.2 g; lithium carbonate, 370.2 g; 1147.8; metasilicic acid, 1.6 g; and water, 20 L |
| Examples 15, 17 | $LiMn_{0.60}Fe_{0.393}V_{0.004}Co_{0.003}P_{0.999}N_{0.001}O_4$ | Manganese carbonate, 689.6 g; ferrous carbonate, 455.3 g; cobalt sulfate, 4.7 g; vanadium dichloride, 4.9 g; water, 5 L; and oxalic acid dihydrate, 1260.6 g | Ferromanganese vanadium cobalt oxalate dihydrate (in terms of $C_2O_4Mn_{0.60}Fe_{0.393}V_{0.004}Co_{0.003} \cdot 2H_2O$) obtained in step S1, 1793.1 g; lithium carbonate, 369.4 g; ammonium dihydrogen phosphate, 1148.9 g; dilute nitric acid, 1.4 g; and water, 20 L |
| Example 16 | $Li_{0.997}Mn_{0.60}Fe_{0.393}V_{0.004}Co_{0.003}P_{0.997}S_{0.003}O_4$ | Manganese carbonate, 689.6 g; ferrous carbonate, 455.3 g; cobalt sulfate, 4.7 g; vanadium dichloride, 4.9 g; water, 5 L; and oxalic acid dihydrate, 1260.6 g | Ferromanganese vanadium cobalt oxalate dihydrate (in terms of $C_2O_4Mn_{0.60}Fe_{0.393}V_{0.004}Co_{0.003} \cdot 2H_2O$) obtained in step S1, 1793.1 g; lithium carbonate, 368.7 g; ammonium dihydrogen phosphate, 1146.6 g; dilute sulfuric acid, 4.9 g; and water, 20 L |
| Example 18 | $LiMn_{0.60}Fe_{0.393}V_{0.004}Mg_{0.003}P_{0.995}N_{0.005}O_4$ | Manganese carbonate, 689.6 g; ferrous carbonate, 455.3 g; magnesium carbonate, 2.5 g; vanadium dichloride, 4.9 g; water, 5 L; and oxalic acid dihydrate, 1260.6 g | Ferromanganese vanadium magnesium oxalate dihydrate (in terms of $C_2O_4Mn_{0.60}Fe_{0.393}V_{0.004}Mg_{0.003} \cdot 2H_2O$) obtained in step S1, 1791.1 g; lithium carbonate, 369.4 g; ammonium dihydrogen phosphate, 1144.3 g; dilute nitric acid, 7.0 g; and water, 20 L |
| Example 19 | $Li_{0.999}Mn_{0.60}Fe_{0.393}V_{0.004}Mg_{0.003}P_{0.999}S_{0.001}O_4$ | Manganese carbonate, 689.6 g; ferrous carbonate, 455.3 g; magnesium carbonate, 2.5 g; vanadium dichloride, 4.9 g; water, 5 L; and oxalic acid dihydrate, 1260.6 g | Ferromanganese vanadium magnesium oxalate dihydrate (in terms of $C_2O_4Mn_{0.60}Fe_{0.393}V_{0.004}Mg_{0.003} \cdot 2H_2O$) obtained in step S1, 1791.1 g; lithium carbonate, 369.0 g; ammonium dihydrogen phosphate, 1148.9 g; dilute sulfuric acid, 1.6 g; and water, 20 L |
| Example 20 | $Li_{0.998}Mn_{0.60}Fe_{0.393}V_{0.004}Ni_{0.003}P_{0.998}S_{0.002}O_4$ | Manganese carbonate, 689.6 g; ferrous carbonate, 455.3 g; nickel carbonate, 3.6 g; vanadium dichloride, 4.9 g; water, 5 L; and oxalic acid dihydrate, 1260.6 g | Ferromanganese vanadium nickel oxalate dihydrate (in terms of $C_2O_4Mn_{0.60}Fe_{0.393}V_{0.004}Ni_{0.003} \cdot 2H_2O$) obtained in step S1, 1792.2 g; lithium carbonate, 368.7 g; ammonium dihydrogen phosphate, 1147.8 g; dilute sulfuric acid, 3.2 g; and water, 20 L |

TABLE 1-continued

| | | Raw materials for preparation of core | |
|---|---|---|---|
| No. | Core | Raw materials used in step S1 | Raw materials used in step S2 |
| Examples 21 to 24 | $Li_{1.001}Mn_{0.60}Fe_{0.393}V_{0.004}Ni_{0.003}P_{0.999}Si_{0.001}O_4$ | Manganese carbonate, 689.6 g; ferrous carbonate, 455.3 g; nickel carbonate, 3.6 g; vanadium dichloride, 4.9 g; water, 5 L; and oxalic acid dihydrate, 1260.6 g | Ferromanganese vanadium nickel oxalate dihydrate (in terms of $C_2O_4Mn_{0.60}Fe_{0.393}V_{0.004}Ni_{0.003} \cdot 2H_2O$) obtained in step S1, 1793.1 g; lithium carbonate, 369.8 g; ammonium dihydrogen phosphate, 1148.9 g; metasilicic acid, 0.8 g; and water, 20 L |
| Example 25 | $Li_{1.001}Mn_{0.50}Fe_{0.493}V_{0.004}Ni_{0.003}P_{0.999}Si_{0.001}O_4$ | Manganese carbonate, 574.7 g; ferrous carbonate, 571.2 g; nickel carbonate, 3.6 g; vanadium dichloride, 4.9 g; water, 5 L; and oxalic acid dihydrate, 1260.6 g | Ferromanganese vanadium nickel oxalate dihydrate (in terms of $C_2O_4Mn_{0.50}Fe_{0.493}V_{0.004}Ni_{0.003} \cdot 2H_2O$) obtained in step S1, 1794.0 g; lithium carbonate, 369.8 g; ammonium dihydrogen phosphate, 1148.9 g; metasilicic acid, 0.8 g; and water, 20 L |
| Example 26 | $Li_{1.001}Mn_{0.999}Fe_{0.001}P_{0.999}Si_{0.001}O_4$ | Manganese carbonate, 1148.2 g; ferrous carbonate, 1.2 g; water, 5 L; and oxalic acid dihydrate, 1260.6 g | Ferromanganese oxalate dihydrate (in terms of $C_2O_4Mn_{0.999}Fe_{0.001} \cdot 2H_2O$) obtained in step S1, 1789.6 g; lithium carbonate, 369.8 g; ammonium dihydrogen phosphate 1148.9 g; metasilicic acid, 0.8 g; and water, 20 L |
| Example 27 | $LiMn_{0.60}Fe_{0.393}V_{0.004}Ni_{0.003}P_{0.9}N_{0.100}O_4$ | Manganese carbonate, 689.6 g; ferrous carbonate, 455.3 g; nickel carbonate, 3.6 g; vanadium dichloride, 4.9 g; water, 5 L; and oxalic acid dihydrate, 1260.6 g | Ferromanganese vanadium nickel oxalate dihydrate (in terms of $C_2O_4Mn_{0.60}Fe_{0.393}V_{0.004}Ni_{0.003} \cdot 2H_2O$) obtained in step S1, 1793.1 g; lithium carbonate, 369.4 g; ammonium dihydrogen phosphate, 1035.1 g; dilute nitric acid, 140.0 g; and water, 20 L |
| Example 28 | $Li_{1.001}Mn_{0.40}Fe_{0.593}V_{0.004}Ni_{0.003}P_{0.999}Si_{0.001}O_4$ | Manganese carbonate, 459.7 g; ferrous carbonate, 686.9 g; vanadium dichloride, 4.8 g; nickel carbonate, 3.6 g; water, 5 L; and oxalic acid dihydrate, 1260.6 g | Ferromanganese vanadium nickel oxalate dihydrate (in terms of $C_2O_4Mn_{0.40}Fe_{0.593}V_{0.004}Ni_{0.003} \cdot 2H_2O$) obtained in step S1, 1794.9 g; lithium carbonate, 369.8 g; ammonium dihydrogen phosphate, 1148.9 g; metasilicic acid, 0.8 g; and water, 20 L |
| Example 29 | $Li_{1.001}Mn_{0.40}Fe_{0.393}V_{0.204}Ni_{0.003}P_{0.999}Si_{0.001}O_4$ | Manganese carbonate, 459.7 g; ferrous carbonate, 455.2 g; vanadium dichloride, 248.6 g; nickel carbonate, 3.6 g; water, 5 L; and oxalic acid dihydrate, 1260.6 g | Ferromanganese vanadium nickel oxalate dihydrate (in terms of $C_2O_4Mn_{0.40}Fe_{0.393}V_{0.204}Ni_{0.003} \cdot 2H_2O$) obtained in step S1, 1785.1 g; lithium carbonate, 369.8 g; ammonium dihydrogen phosphate, 1148.9 g; metasilicic acid, 0.8 g; and water, 20 L |

TABLE 2

| | Preparation of first coating layer suspension (step S3) | |
|---|---|---|
| Example No. | Coating substance in first coating layer | Preparation of first coating layer suspension |
| Comparative example 1 | Amorphous $Li_2FeP_2O_7$ | 7.4 g of lithium carbonate; 11.6 g of ferrous carbonate; 23.0 g of ammonium dihydrogen phosphate; and 12.6 g of oxalic acid dihydrate; with pH value controlled to be 5 |
| Examples 13 to 15, 17, and Examples 1 to 14, 19, 21 to 29 | Crystalline $Li_2FeP_2O_7$ | 7.4 g of lithium carbonate; 11.6 g of ferrous carbonate; 23.0 g of ammonium dihydrogen phosphate; and 12.6 g of oxalic acid dihydrate; with pH value controlled to be 5 |
| Examples 15 and 16 | Crystalline $Al_4(P_2O_7)_3$ | 53.3 g of aluminum chloride; 34.5 g of ammonium dihydrogen phosphate; 18.9 g of oxalic acid dihydrate; with pH value controlled to be 4 |
| Examples 17, 18, and 20 | Crystalline $Li_2NiP_2O_7$ | 7.4 g of lithium carbonate; 11.9 g of nickel carbonate; 23.0 g of ammonium dihydrogen phosphate; and 12.6 g of oxalic acid dihydrate; with pH value controlled to be 5 |

TABLE 3

Application of first coating layer (step S4)

| No. | Coating substance and coating amount of first coating layer (based on weight of core) | Amount of core added in step S4 | Amount of corresponding coating substance in the first coating layer suspension | Mixing time (hours) | Drying temperature (° C.) | Sintering temperature (° C.) | Sintering time (hours) |
|---|---|---|---|---|---|---|---|
| Comparative example 1 | 2% amorphous $Li_2FeP_2O_7$ | 1570.4 g | 31.4 g | 6 | 120 | 500 | 4 |
| Examples 1-4 and 8-10 | 1% $Li_2FeP_2O_7$ | 1571.9 g | 15.7 g | 6 | 120 | 650 | 6 |
| Example 5 | 2% $Li_2FeP_2O_7$ | 1571.9 g | 31.4 g | 6 | 120 | 650 | 6 |
| Example 6 | 3% $Li_2FeP_2O_7$ | 1571.1 g | 47.1 g | 6 | 120 | 650 | 6 |
| Example 7 | 5% $Li_2FeP_2O_7$ | 1571.9 g | 78.6 g | 6 | 120 | 650 | 6 |
| Example 11 | 1% $Li_2FeP_2O_7$ | 1572.1 g | 15.7 g | 6 | 120 | 650 | 6 |
| Example 12 | 1% $Li_2FeP_2O_7$ | 1571.7 g | 15.7 g | 6 | 120 | 650 | 6 |
| Example 13 | 2% $Li_2FeP_2O_7$ | 1571.4 g | 31.4 g | 6 | 120 | 650 | 6 |
| Example 14 | 2.5% $Li_2FeP_2O_7$ | 1571.9 g | 39.3 g | 6 | 120 | 650 | 6 |
| Example 15 | 2% $Al_4(P_2O_7)_3$ | 1571.9 g | 31.4 g | 6 | 120 | 680 | 8 |
| Example 16 | 3% $Al_4(P_2O_7)_3$ | 1571.9 g | 47.2 g | 6 | 120 | 680 | 8 |
| Example 17 | 1.5% $Li_2NiP_2O_7$ | 1571.9 g | 23.6 g | 6 | 120 | 630 | 6 |
| Example 18 | 1% $Li_2NiP_2O_7$ | 1570.1 g | 15.7 g | 6 | 120 | 630 | 6 |
| Example 19 | 2% $Li_2FeP_2O_7$ | 1571.0 g | 31.4 g | 6 | 120 | 650 | 6 |
| Example 20 | 1% $Li_2NiP_2O_7$ | 1571.9 g | 15.7 g | 6 | 120 | 630 | 6 |
| Examples 21 to 24 | 2% $Li_2FeP_2O_7$ | 1572.1 g | 31.4 g | 6 | 120 | 650 | 6 |
| Example 22 | 5.50% $Li_2FeP_2O_7$ | 1572.1 g | 86.5 g | 6 | 120 | 650 | 6 |
| Example 25 | 1% $Li_2FeP_2O_7$ | 1573.0 g | 15.7 g | 6 | 120 | 650 | 6 |
| Example 26 | 1% $Li_2FeP_2O_7$ | 1568.6 g | 15.7 g | 6 | 120 | 650 | 6 |
| Example 27 | 1% $Li_2FeP_2O_7$ | 1569.2 g | 15.7 g | 6 | 120 | 650 | 6 |
| Example 28 | 2% crystalline $Li_2FeP_2O_7$ | 1573.9 g | 31.4 g | 6 | 120 | 650 | 6 |
| Example 29 | 2% crystalline $Li_2FeP_2O_7$ | 1564.1 g | 31.2 g | 6 | 120 | 650 | 6 |

TABLE 4

Preparation of second coating layer suspension (step S5)

| Example No. | Second coating layer substance | Step S5: Preparation of second coating layer suspension |
|---|---|---|
| Comparative example 3 and Examples 1 to 14, 18 and 19, and 25 to 27 | Crystalline $LiFePO_4$ | 3.7 g of lithium carbonate; 11.6 g of ferrous carbonate; 11.5 g of ammonium dihydrogen phosphate; and 12.6 g of oxalic acid dihydrate |
| Examples 15, 17, 20, 21 to 24, 28 and 29 | Crystalline $LiCoPO_4$ | 3.7 g of lithium carbonate; 15.5 g of cobalt sulfate; 11.5 g of ammonium dihydrogen phosphate; and 12.6 g of oxalic acid dihydrate |
| Example 16 | Crystalline $LiNiPO_4$ | 3.7 g of lithium carbonate; 11.9 g of nickel carbonate; 11.5 g of ammonium dihydrogen phosphate; and 12.6 g of oxalic acid dihydrate |

TABLE 5

Coating of second coating layer (step S6)

| No. | Coating substance and amount of second coating layer (based on weight of core) | Amount of pyrophosphate-coated material added in step S6 (amount of core added in the case of Comparative example 12) (g) | Amount of corresponding coating substance in second coating layer suspension (g) | Mixing time (hours) | Drying temperature (° C.) | Sintering temperature (° C.) | Sintering time (hours) |
|---|---|---|---|---|---|---|---|
| Comparative example 3 | 3% $LiFePO_4$ | 1571.1 | 47.1 | 6 | 120 | 700 | 8 |
| Examples 1-4 | 3% $LiFePO_4$ | 1586.8 | 47.1 | 6 | 120 | 700 | 8 |
| Example 5 | 3% $LiFePO_4$ | 1602.5 | 47.1 | 6 | 120 | 700 | 8 |
| Example 6 | 3% $LiFePO_4$ | 1618.2 | 47.1 | 6 | 120 | 700 | 8 |
| Example 7 | 3% $LiFePO_4$ | 1649.6 | 47.1 | 6 | 120 | 700 | 8 |
| Example 8 | 1% $LiFePO_4$ | 1586.8 | 15.7 | 6 | 120 | 700 | 8 |

TABLE 5-continued

Coating of second coating layer (step S6)

| No. | Coating substance and amount of second coating layer (based on weight of core) | Amount of pyrophosphate-coated material added in step S6 (amount of core added in the case of Comparative example 12) (g) | Step S6: Coating of second coating layer ||||| 
|---|---|---|---|---|---|---|---|
| | | | Amount of corresponding coating substance in second coating layer suspension (g) | Mixing time (hours) | Drying temperature (° C.) | Sintering temperature (° C.) | Sintering time (hours) |
| Example 9 | 4% LiFePO$_4$ | 1586.8 | 62.8 | 6 | 120 | 700 | 8 |
| Example 10 | 5% LiFePO$_4$ | 1586.8 | 78.6 | 6 | 120 | 700 | 8 |
| Example 11 | 2.50% LiFePO$_4$ | 1587.8 | 39.3 | 6 | 120 | 700 | 8 |
| Example 12 | 3% LiFePO$_4$ | 1587.4 | 47.2 | 6 | 120 | 700 | 8 |
| Example 13 | 2% LiFePO$_4$ | 1602.8 | 31.4 | 6 | 120 | 700 | 8 |
| Example 14 | 3.50% LiFePO$_4$ | 1610.5 | 55.0 | 6 | 120 | 700 | 8 |
| Example 15 | 2.5% LiCoPO$_4$ | 1603.3 | 39.3 | 6 | 120 | 750 | 8 |
| Example 16 | 3% LiNiPO$_4$ | 1619.0 | 47.2 | 6 | 120 | 680 | 8 |
| Example 17 | 2.5% LiCoPO$_4$ | 1595.5 | 39.3 | 6 | 120 | 750 | 8 |
| Example 18 | 3% LiFePO$_4$ | 1585.9 | 47.1 | 6 | 120 | 700 | 8 |
| Example 19 | 4% LiFePO$_4$ | 1602.4 | 62.8 | 6 | 120 | 700 | 8 |
| Example 20 | 3% LiCoPO$_4$ | 1587.7 | 47.2 | 6 | 120 | 750 | 8 |
| Example 21 | 4% LiCoPO$_4$ | 1603.5 | 62.9 | 6 | 120 | 750 | 8 |
| Example 22 | 4% LiCoPO$_4$ | 1658.6 | 62.9 | 6 | 120 | 750 | 8 |
| Example 23 | 5.50% LiCoPO$_4$ | 1603.5 | 86.5 | 6 | 120 | 750 | 8 |
| Example 24 | 4% LiCoPO$_4$ | 1603.5 | 62.9 | 6 | 120 | 750 | 8 |
| Example 25 | 3% LiFePO$_4$ | 1588.7 | 47.2 | 6 | 120 | 700 | 8 |
| Example 26 | 3% LiFePO$_4$ | 1584.3 | 47.1 | 6 | 120 | 700 | 8 |
| Example 27 | 3% LiFePO$_4$ | 1584.9 | 47.1 | 6 | 120 | 700 | 8 |
| Example 28 | 4% LiCoPO$_4$ | 1605.4 | 63.0 | 6 | 120 | 750 | 8 |
| Example 29 | 4% LiCoPO$_4$ | 1605.4 | 63.0 | 6 | 120 | 750 | 8 |

TABLE 6

Coating of third coating layer (step S8)

| | Third coating layer | Molar ratio of SP2 to SP3 | Amount of two-layer-coated material added in step S8 (amount of core added in the case of Comparative examples 1 and 2, and 4 to 10, and amount of first-layer-coated material added in the case of Comparative example 11) (g) | Step S8: Application of third coating layer ||||| 
|---|---|---|---|---|---|---|---|---|
| | | | | Amount of sucrose (g) | Mixing time (hours) | Drying temperature (° C.) | Sintering temperature (° C.) | Sintering time (hours) |
| Comparative example 1 | 2% Carbon | 2.7 | 1601.8 | 74.6 | 6 | 150 | 680 | 7 |
| Comparative example 2 | 1% carbon | 2.4 | 1571.0 | 37.3 | 6 | 150 | 630 | 8 |
| Comparative example 3 | 1% carbon | 2.1 | 1618.2 | 37.3 | 6 | 150 | 600 | 6 |
| Example 1 | 1% carbon | 2.2 | 1633.9 | 37.3 | 6 | 150 | 700 | 10 |
| Example 2 | 3% carbon | 2.3 | 1633.9 | 111.9 | 6 | 150 | 600 | 9 |
| Example 3 | 4% carbon | 2.1 | 1633.9 | 149.2 | 6 | 150 | 600 | 6 |
| Example 4 | 5% carbon | 2.4 | 1633.9 | 186.5 | 6 | 150 | 630 | 8 |
| Example 5 | 1% carbon | 2.5 | 1649.6 | 37.3 | 6 | 150 | 650 | 8 |
| Example 6 | 1% carbon | 2.5 | 1665.3 | 37.3 | 6 | 150 | 650 | 8 |
| Example 7 | 1% carbon | 2.4 | 1696.7 | 37.3 | 6 | 150 | 630 | 8 |
| Example 8 | 1% carbon | 2.3 | 1602.5 | 37.3 | 6 | 150 | 600 | 9 |
| Example 9 | 1% carbon | 2.2 | 1649.6 | 37.3 | 6 | 150 | 600 | 8 |
| Example 10 | 1% carbon | 2.2 | 1665.3 | 37.3 | 6 | 150 | 600 | 9 |
| Example 11 | 1.5% carbon | 2.3 | 1629.0 | 56.1 | 6 | 150 | 600 | 9 |
| Example 12 | 2% Carbon | 2.4 | 1634.6 | 74.7 | 6 | 150 | 630 | 8 |
| Example 13 | 2% Carbon | 2.5 | 1634.2 | 74.6 | 6 | 150 | 650 | 8 |
| Example 14 | 2.5% carbon | 2.7 | 1665.5 | 93.3 | 6 | 150 | 680 | 7 |
| Example 15 | 2% Carbon | 2.8 | 1642.6 | 74.7 | 6 | 150 | 680 | 8 |
| Example 16 | 1% carbon | 2.7 | 1666.2 | 37.3 | 6 | 150 | 680 | 7 |
| Example 17 | 1.5% carbon | 2.3 | 1634.8 | 56.0 | 6 | 150 | 600 | 9 |
| Example 18 | 1% carbon | 2.6 | 1633.0 | 37.3 | 6 | 150 | 650 | 7 |
| Example 19 | 1.5% carbon | 2.4 | 1665.2 | 56.0 | 6 | 150 | 630 | 8 |
| Example 20 | 1.5% carbon | 2.2 | 1634.8 | 56.0 | 6 | 150 | 600 | 9 |
| Example 21 | 1% carbon | 2.2 | 1666.4 | 37.3 | 6 | 150 | 600 | 9 |
| Example 22 | 1% carbon | 2.3 | 1721.4 | 37.3 | 6 | 150 | 600 | 9 |
| Example 23 | 1% carbon | 2.4 | 1690.0 | 37.3 | 6 | 150 | 630 | 8 |

TABLE 6-continued

Coating of third coating layer (step S8)

| | Third coating layer | Molar ratio of SP2 to SP3 | Amount of two-layer-coated material added in step S8 (amount of core added in the case of Comparative examples 1 and 2, and 4 to 10, and amount of first-layer-coated material added in the case of Comparative example 11) (g) | Step S8: Application of third coating layer | | | | |
|---|---|---|---|---|---|---|---|---|
| | | | | Amount of sucrose (g) | Mixing time (hours) | Drying temperature (° C.) | Sintering temperature (° C.) | Sintering time (hours) |
| Example 24 | 5.5% carbon | 2.6 | 1666.4 | 205.4 | 6 | 150 | 650 | 7 |
| Example 25 | 1% carbon | 2.4 | 1635.9 | 37.4 | 6 | 150 | 630 | 8 |
| Example 26 | 1% carbon | 2.3 | 1631.3 | 37.3 | 6 | 150 | 600 | 9 |
| Example 27 | 1.5% carbon | 2.1 | 1631.9 | 55.9 | 6 | 150 | 600 | 6 |
| Example 28 | 1% carbon | 0.07 | 1668.3 | 37.4 | 6 | 80 | 600 | 6 |
| Example 29 | 1% carbon | 13 | 1668.3 | 37.4 | 6 | 150 | 850 | 10 |

II. Performance Evaluation

1. Test Method of Lattice Change Rate:

At a constant temperature of 25° C., the positive electrode active material samples were placed in an XRD instrument (model: Bruker D8 Discover), and the samples were tested at 1°/minute. The test data were organized and analyzed, and the lattice constants a0, b0, c0, and v0 (where a0, b0, and c0 represent the lengths of faces of the unit cell, and v0 denotes the volume of the unit cell, which can be obtained directly from XRD refinement results) at this moment were calculated with reference to standard PDF cards.

The positive electrode active material samples were prepared into button cells using the preparation method of button cell in the foregoing examples, and the button cells were charged at a small rate of 0.05C until the current was reduced to 0.01C. The positive electrode plate in the button cell was then removed and soaked in dimethyl carbonate (DMC) for 8 hours, then dried and powder scraped, and particles with a particle size less than 500 nm were sifted out. Samples were taken and their unit cell volumes v1 were calculated in the same way as the fresh samples under test above, and (v0−v1)/v0×100% was taken as their lattice change rates (unit cell volume change rate) before and after complete lithium deintercalation or intercalation were shown in the table.

2. Li/Mn Antisite Defect Concentration

The Li/Mn antisite defect concentration was obtained by comparing the XRD results in the "lattice change rate measurement method" with the standard crystal PDF (Powder Diffraction File) cards. Specifically, the XRD results in the "lattice change rate measurement method" were imported into the general structural analysis system (GSAS) software for automatic obtaining of refinement results that contain the occupancy of the different atoms, and the Li/Mn antisite defect concentration was obtained by reading the refinement results.

3. Compacted Density 5 g of the prepared positive electrode active material powder was taken and put in a special mold for compaction (CARVER mold, model 13 mm, USA), and then the mold was placed on a compacted density tester. A pressure of 3 tons was applied, the thickness of the powder under pressure (thickness after pressure relief) on the device was read, and the compacted density was calculated based on ρ=m/v, where the area value used was a standard small picture area of 1540.25 mm².

4. 3C Constant Current Charging Ratio

New prepared full batteries of the foregoing examples and comparative examples were left standing for 5 minutes in a constant temperature environment of 25° C. and discharged to 2.5 V at ⅓C. The full batteries were left standing for 5 minutes, charged to 4.3 V at ⅓C, and then charged at constant voltage of 4.3 V to a current less than or equal to 0.05 mA. The full batteries were left standing for 5 minutes. A charge capacity at this moment was recorded as C0. The full batteries were discharge at ⅓C to 2.5 V, left standing for 5 minutes, then charged at 3C to 4.3 V, and left standing for 5 minutes. A charge capacity at this moment was recorded as C1. The 3C constant current charging ratio was C1/C0× 100%.

A higher 3C constant current charging ratio indicates better rate performance of the secondary battery.

5. Test for Transition Metal Mn (and Fe Doped at the Mn Site)

Prepared full batteries of the foregoing examples and comparative examples that were cycled at 45° C. until the capacity faded to 80% were discharged to a cut-off voltage of 2.0 V at 0.1C. The battery was then disassembled, the negative electrode plate was removed, and 30 discs with a unit area (1540.25 mm²) were randomly taken on the negative electrode plate and tested by using Agilent ICP-OES730 for inductively coupled plasma atomic emission spectroscopy (ICP). The amounts of Fe (if the Mn site of the positive electrode active material was doped with Fe) and Mn were calculated from the ICP results, so as to calculate the amount of Mn (and Fe doping at the Mn site) dissolved after cycling. The test standard is in accordance with EPA-6010D-2014.

6. Valence State of Surface Oxygen 5 g of the prepared positive electrode active material sample was taken and used for preparation of a button cell according to the preparation method of button cell in the foregoing examples. The button cell was charged at a small rate of 0.05C until the current was reduced to 0.01C. The positive electrode plate was then taken out from the button battery and soaked in DMC for 8 hours, then dried and powder scraped, and particles with a particle size less than 500 nm were sifted out. The thus obtained particles were measured by using electron energy loss spectroscopy (EELS; the model of the instrument used was Tabs F200S) to obtain energy loss near edge structures (ELNES) that reflect the density of states and energy level distribution of elements. Based on the density of states and energy level distribution, the number of occupied electrons was calculated by integrating the data of the valence band density of states to deduce the valence state of surface oxygen after charging.

7. Measurement of Elements Manganese and Phosphorus in Positive Electrode Active Material 5 g of the prepared positive electrode active material was dissolved in 100 mL of inverse aqua regia (concentrated hydrochloric acid:concentrated nitric acid=1:3) (concentration of concentrated hydrochloric acid is about 37%, and concentration of concentrated nitric acid is about 65%), the amount of each element in the solution was tested using ICP, and then the amount of element manganese or element phosphorus (amount of element manganese or element phosphorus/amount of positive electrode active material×100%) was measured and converted to get its weight percentage.

8. Method for Measuring Initial Gram Capacity of Button Battery

Under a voltage of 2.5 V to 4.3 V, the prepared button batteries of the foregoing examples and comparative examples were charged to 4.3 V at 0.1C, then charged at constant voltage of 4.3 V to a current less than or equal to 0.05 mA, left standing for 5 minutes, and then discharged to 2.0 V at 0.1C. A discharge capacity at this moment was an initial gram capacity and recorded as D0.

10. Test for Cell Swelling of Full Battery after 30 Days of Storage at 60° C.

The prepared full batteries of the foregoing examples and comparative examples at 100% state of charge (SOC) were stored at 60° C. The open circuit voltages (OCV) and alternating current impedance (IMP) of the cells were measured before, during, and after storage to monitor the SOCs, and the volumes of the cells were measured. The full batteries were removed after every 48 h of storage and left standing for 1 h. Then the open circuit voltage (OCV) and impedance (IMP) were measured, and the cell volumes were measured by a drainage method after the batteries were cooled to room temperature. In the drainage method, first a scale that automatically performs unit conversion on dial data was used to separately measure a weight of the cell, denoted as $F_1$, then the cell was completely placed into deionized water (density known to be 1 g/cm$^3$), and the weight of the cell at this moment was measured as $F_2$. The buoyant force experienced by the cell, denoted as F_buoyancy, is calculated as $F_1-F_2$. Then, according to Archimedes' principle, F_buoyancy=$\rho \times g \times V_{displacement}$, the volume V of the cell can be calculated as cell volume V=$(F_1-F_2)/(\rho \times g)$.

It can be learned from the OCV and IMP test results that the batteries of all the examples always maintained an SOC higher than 99% throughout the storage test.

After 30 days of storage, the cell volumes were measured and the percentage increases in the cell volumes after storage relative to the cell volumes before storage were calculated.

11. Test for Cycling Performance of Full Battery at 45° C.

The battery was charged to 4.3 V at 1C under a voltage of 2.5 V to 4.3 V in a constant temperature environment of 45° C., and then charged to a current less than or equal to 0.05 mA at a constant voltage of 4.3 V. After being left standing for 5 minutes, the battery was discharged to 2.5 V at 1C, and a capacity at this moment was recorded as $D_n$ (n=0, 1, 2, . . . ). The previous process was repeated until the capacity was faded (fading) to 80%, and the number of repetitions at this moment was record, which is the number of cycles corresponding to 80% capacity retention rate at 45° C.

12. Test for Interplanar Spacing and Included Angle 1 g of each prepared positive electrode active material powder was taken and placed into a 50 mL test tube, 10 mL of alcohol with a mass fraction of 75% was injected into the test tube and then fully stirred and dispersed for 30 minutes, then an appropriate amount of the solution was taken with a clean disposable plastic pipette and added dropwise on a 300 mesh copper grid, and in this case, part of the powder would remain on the copper grid. The copper grid with the sample was transferred to the TEM (Tabs F200s G2) sample cavity for testing, and original TEM test images were obtained and saved in an original image format (xx.dm3).

The original image obtained from the TEM test was opened in DigitalMicrograph software, and Fourier transform was performed (done automatically by the software upon clicking) to obtain a diffraction pattern. A distance from the diffracted spot to the center of the diffraction pattern was measured to obtain the interplanar spacing, and the included angle was calculated according to the Bragg equation.

By comparing the obtained data about the interplanar spacing and corresponding included angle with their respective standard values, the substances of different coating layers could be identified.

13. Test for Coating Layer Thickness

The thickness of the coating layer was tested mainly in the following manner. A thin slice of about 100 nm thickness was cut from the middle of a single particle of the prepared positive electrode active material by FIB, then a TEM test was performed on the thin slice, and original TEM test images were obtained and saved in an original image format (xx.dm3).

The original image obtained from the TEM test was opened in DigitalMicrograph software, the coating layer was identified by using the information of the interplanar spacing and included angle, and the thickness of the coating layer was measured.

The thickness at three locations was measured for the selected particles and the average value was taken.

14. Measurement of Molar Ratio of SP2 Carbon to SP3 Carbon in the Carbon in Third Coating Layer This test was performed by Raman (Raman) spectroscopy. The energy spectrum of the Raman test was split to obtain Id/Ig, where Id is a peak intensity of SP3 carbon and Ig is a peak intensity of SP2 carbon, and then the molar ratio therebetween was determined.

The performance test results of all examples and comparative examples are shown in the following tables.

TABLE 7

Performance of positive electrode active material powder of Examples 1 to 29 and Comparative examples 1 to 3 and performance of batteries prepared using the same

| Example No. | Performance of positive electrode active material powder | | | | | | Battery performance | | |
|---|---|---|---|---|---|---|---|---|---|
| | Lattice change rate (%) | Li/Mn antisite defect concentration (%) | Compacted density (g/cm³) | Valence state of surface oxygen | 3 C constant current charging ratio (%) | Amounts of Mn and Fe dissolved after cycling (ppm) | Button cell capacity at 0.1 C (mAh/g) | Cell swelling rate after 30 days of storage at 60° C. (%) | Number of cycles at 80% capacity retention rate at 45° C. |
| Comparative example 1 | 10.8 | 3.4 | 1.64 | −1.64 | 54 | 1469 | 145.0 | 35.6 | 397 |
| Comparative example 2 | 4.3 | 2.8 | 1.69 | −1.82 | 59 | 932 | 151.5 | 7.1 | 579 |
| Comparative example 3 | 2.3 | 2.1 | 1.95 | −1.95 | 52 | 15 | 154.9 | 3.6 | 835 |
| Example 1 | 2.5 | 1.8 | 2.35 | −1.93 | 73 | 6.0 | 157.5 | 3.6 | 1184 |
| Example 2 | 2.5 | 1.8 | 2.24 | −1.94 | 73 | 5.1 | 156.6 | 3.1 | 1316 |
| Example 3 | 2.5 | 1.8 | 2.22 | −1.94 | 73 | 4.3 | 155.7 | 2.9 | 1443 |
| Example 4 | 2.5 | 1.8 | 2.21 | −1.95 | 73 | 2.6 | 154.0 | 2.5 | 1476 |
| Example 5 | 2.5 | 1.8 | 2.33 | −1.93 | 73 | 4.3 | 157.0 | 2.6 | 1576 |
| Example 6 | 2.5 | 1.8 | 2.31 | −1.93 | 72 | 3.4 | 156.5 | 2.4 | 1655 |
| Example 7 | 2.5 | 1.8 | 2.28 | −1.93 | 71 | 2.6 | 156.1 | 2.1 | 1729 |
| Example 8 | 2.5 | 1.8 | 2.29 | −1.93 | 72 | 7.7 | 156.7 | 2.9 | 1111 |
| Example 9 | 2.5 | 1.8 | 2.46 | −1.98 | 76 | 5.1 | 157.9 | 2.5 | 1350 |
| Example 10 | 2.5 | 1.8 | 2.49 | −1.98 | 78 | 4.3 | 158.1 | 2.1 | 1560 |
| Example 11 | 2.6 | 1.9 | 2.38 | −1.97 | 75 | 5.1 | 157.6 | 3.0 | 1077 |
| Example 12 | 2.4 | 1.8 | 2.41 | −1.97 | 77 | 3.4 | 156.6 | 2.1 | 1193 |
| Example 13 | 2.7 | 1.9 | 2.42 | −1.97 | 78 | 4.3 | 156.9 | 3.0 | 1267 |
| Example 14 | 2.8 | 1.9 | 2.45 | −1.97 | 80 | 2.6 | 154.1 | 3.1 | 1373 |
| Example 15 | 2.2 | 1.9 | 2.46 | −1.97 | 77 | 2.6 | 154.1 | 3.1 | 1164 |
| Example 16 | 2.1 | 1.9 | 2.47 | −1.98 | 76 | 4.3 | 154.5 | 3.2 | 1189 |
| Example 17 | 2.5 | 1.7 | 2.41 | −1.98 | 78 | 3.4 | 155.7 | 3.8 | 1321 |
| Example 18 | 2.3 | 1.6 | 2.42 | −1.97 | 79 | 3.4 | 154.6 | 4.0 | 1447 |
| Example 19 | 2.2 | 1.7 | 2.43 | −1.97 | 80 | 3.4 | 154.6 | 4.0 | 1394 |
| Example 20 | 2.6 | 1.8 | 2.42 | −1.94 | 78 | 3.4 | 154.2 | 2.8 | 1531 |
| Example 21 | 2.4 | 1.7 | 2.41 | −1.97 | 79 | 3.4 | 154.8 | 3.0 | 1393 |
| Example 22 | 2.4 | 1.8 | 2.32 | −1.95 | 75 | 1.7 | 152.4 | 2.3 | 1634 |
| Example 23 | 2.3 | 1.7 | 2.46 | −1.96 | 79 | 2.6 | 151.7 | 2.0 | 1727 |
| Example 24 | 2.2 | 1.8 | 2.47 | −1.95 | 79 | 2.6 | 152.4 | 2.1 | 1625 |
| Example 25 | 2.1 | 1.7 | 2.49 | −1.98 | 82 | 2.6 | 158.9 | 2.5 | 1615 |
| Example 26 | 3.6 | 2.5 | 2.21 | −1.97 | 59 | 6.8 | 152.6 | 4.1 | 1068 |
| Example 27 | 2.8 | 2.1 | 2.24 | −1.98 | 77 | 5.1 | 155.7 | 3.2 | 1182 |
| Example 28 | 2.5 | 1.9 | 1.95 | −1.94 | 57 | 7.7 | 155.2 | 5.4 | 1035 |
| Example 29 | 2.4 | 1.8 | 1.98 | −1.95 | 71 | 6.0 | 155.9 | 3.8 | 1099 |

It can be learned from Table 7 that compared with the comparative examples, the examples of this application achieve smaller lattice change rate, smaller Li/Mn antisite defect concentration, greater compacted density, surface oxygen valence closer to −2 valence, less amount of Mn and Fe dissolved after cycles, and better battery performance, for example better high-temperature storage performance and high-temperature cycling performance.

TABLE 8

Thickness and weight ratio of element manganese to element phosphorus of each layer of the positive electrode active materials prepared in Examples 1 to 14 and Comparative examples 1 to 3

| No. | Core | First coating layer | Second coating layer | Third coating layer | Thickness of first coating layer (nm) | Thickness of second coating layer (nm) | Thickness of third coating layer (nm) | Percentage of element Mn (wt %) | Weight ratio of element Mn to element P |
|---|---|---|---|---|---|---|---|---|---|
| Comparative example 1 | LiMn$_{0.80}$Fe$_{0.20}$PO$_4$ | 2% amorphous Li$_2$FeP$_2$O$_7$ | — | 2% Carbon | 4 | — | 10 | 26.1 | 1.383 |
| Comparative example 2 | LiMn$_{0.70}$Fe$_{0.295}$V$_{0.005}$PO$_4$ | — | — | 1% carbon | — | — | 5 | 24.3 | 1.241 |
| Comparative example 3 | Li$_{0.999}$Mn$_{0.60}$Fe$_{0.393}$V$_{0.004}$Co$_{0.003}$P$_{0.999}$S$_{0.001}$O$_4$ | — | 3% crystalline LiFePO$_4$ | 1% carbon | — | 7.5 | 5 | 19.6 | 1.034 |

TABLE 8-continued

Thickness and weight ratio of element manganese to element phosphorus of each layer of the positive electrode active materials prepared in Examples 1 to 14 and Comparative examples 1 to 3

| No. | Core | First coating layer | Second coating layer | Third coating layer | Thickness of first coating layer (nm) | Thickness of second coating layer (nm) | Thickness of third coating layer (nm) | Percentage of element Mn (wt %) | Weight ratio of element Mn to element P |
|---|---|---|---|---|---|---|---|---|---|
| Example 1 | $Li_{0.997}Mn_{0.60}Fe_{0.393}V_{0.004}Co_{0.003}P_{0.997}S_{0.003}O_4$ | 1% $Li_2FeP_2O_7$ | 3% $LiFePO_4$ | 1% carbon | 2 | 7.5 | 5 | 19.0 | 1.023 |
| Example 2 | $Li_{0.997}Mn_{0.60}Fe_{0.393}V_{0.004}Co_{0.003}P_{0.997}S_{0.003}O_4$ | 1% $Li_2FeP_2O_7$ | 3% $LiFePO_4$ | 3% carbon | 2 | 7.5 | 15 | 18.3 | 1.023 |
| Example 3 | $Li_{0.997}Mn_{0.60}Fe_{0.393}V_{0.004}Co_{0.003}P_{0.997}S_{0.003}O_4$ | 1% $Li_2FeP_2O_7$ | 3% $LiFePO_4$ | 4% carbon | 2 | 7.5 | 20 | 18.0 | 1.023 |
| Example 4 | $Li_{0.997}Mn_{0.60}Fe_{0.393}V_{0.004}Co_{0.003}P_{0.997}S_{0.003}O_4$ | 1% $Li_2FeP_2O_7$ | 3% $LiFePO_4$ | 5% carbon | 2 | 7.5 | 25 | 17.9 | 1.023 |
| Example 5 | $Li_{0.997}Mn_{0.60}Fe_{0.393}V_{0.004}Co_{0.003}P_{0.997}S_{0.003}O_4$ | 2% $Li_2FeP_2O_7$ | 3% $LiFePO_4$ | 1% carbon | 4 | 7.5 | 5 | 18.7 | 1.011 |
| Example 6 | $Li_{0.997}Mn_{0.60}Fe_{0.393}V_{0.004}Co_{0.003}P_{0.997}S_{0.003}O_4$ | 3% $Li_2FeP_2O_7$ | 3% $LiFePO_4$ | 1% carbon | 6 | 7.5 | 5 | 18.3 | 0.999 |
| Example 7 | $Li_{0.997}Mn_{0.60}Fe_{0.393}V_{0.004}Co_{0.003}P_{0.997}S_{0.003}O_4$ | 5% $Li_2FeP_2O_7$ | 3% $LiFePO_4$ | 1% carbon | 10 | 7.5 | 5 | 17.6 | 0.975 |
| Example 8 | $Li_{0.997}Mn_{0.60}Fe_{0.393}V_{0.004}Co_{0.003}P_{0.997}S_{0.003}O_4$ | 1% $Li_2FeP_2O_7$ | 1% $LiFePO_4$ | 1% carbon | 2 | 2.5 | 5 | 19.8 | 1.043 |
| Example 9 | $Li_{0.997}Mn_{0.60}Fe_{0.393}V_{0.004}Co_{0.003}P_{0.997}S_{0.003}O_4$ | 1% $Li_2FeP_2O_7$ | 4% $LiFePO_4$ | 1% carbon | 2 | 10 | 5 | 18.7 | 1.014 |
| Example 10 | $Li_{0.997}Mn_{0.60}Fe_{0.393}V_{0.004}Co_{0.003}P_{0.997}S_{0.003}O_4$ | 1% $Li_2FeP_2O_7$ | 5% $LiFePO_4$ | 1% carbon | 2 | 12.5 | 5 | 18.4 | 1.004 |
| Example 11 | $Li_{1.001}Mn_{0.60}Fe_{0.393}V_{0.004}Co_{0.003}P_{0.999}Si_{0.001}O_4$ | 1% $Li_2FeP_2O_7$ | 2.50% $LiFePO_4$ | 1.5% carbon | 2 | 6.3 | 7.5 | 19.0 | 1.026 |
| Example 13 | $Li_{0.995}Mn_{0.65}Fe_{0.341}V_{0.004}Co_{0.005}P_{0.995}S_{0.005}O_4$ | 2% $Li_2FeP_2O_7$ | 2% $LiFePO_4$ | 2% Carbon | 4 | 5 | 10 | 18.7 | 1.108 |
| Example 14 | $Li_{1.002}Mn_{0.70}Fe_{0.293}V_{0.004}Co_{0.003}P_{0.998}Si_{0.002}O_4$ | 2.5% $Li_2FeP_2O_7$ | 3.50% $LiFePO_4$ | 2.5% carbon | 5 | 8.8 | 12.5 | 17.8 | 1.166 |

It can be learned from Table 8 that by doping the manganese and phosphorus sites of lithium manganese iron phosphate (containing 35% manganese and about 20% phosphorus) and three-layer coating, the percentage of element manganese and the weight ratio of element manganese to element phosphorus in the positive electrode active material are significantly reduced; furthermore, comparing Examples 1 to 14 with Comparative examples 1, 2, and 3, it can be learned from Table 7 that the decrease of elements manganese and phosphorus in the positive electrode active material leads to the decrease of the amounts of manganese and iron dissolved and the battery performance of the secondary batteries prepared therefrom is improved.

Examples 30-70

The positive electrode active materials, button cells, and full cells were prepared in the same manner as those in Example 6, but the compositions of the electrolyte were changed, as shown in Table 9 below.

In addition, performance data of the button cells or full cells of Examples 30-70 measured according to the foregoing performance test method are as shown in Table 10.

TABLE 9

Compositions of electrolyte

| Example No. | First additive | Percentage W1 (%) | Second additive | Percentage W2 (%) | A defined as W2/W1 | Electrolytic salt | Concentration of electrolytic salt (M) | B defined as W1/(C1 + C2 + C3) |
|---|---|---|---|---|---|---|---|---|
| 30 | Same as Example 6 | 0.5 | Same as Example 6 | | 2.00 | Same as Example 6 | | 0.07 |
| 31 | | 5 | | | 0.20 | | | 0.71 |
| 32 | | 0.2 | | | 5.00 | | | 0.03 |
| 33 | | 8 | | | 0.13 | | | 1.14 |
| 34 | | 0.01 | | | 100 | | | 0.001 |
| 35 | | 20 | | | 0.05 | | | 2.86 |
| 36 | | 0.005 | | | 200 | | | 0.00 |
| 37 | | 21 | | | 0.05 | | | 3.00 |
| 38 | | Same as Example 6 | | 0.3 | 0.15 | Same as Example 6 | | 0.29 |
| 39 | | | | 5 | 2.5 | | | 0.29 |
| 40 | | | | 0.2 | 0.1 | | | 0.29 |
| 41 | | | | 8 | 4 | | | 0.29 |

TABLE 9-continued

Compositions of electrolyte

| Example No. | First additive | Percentage W1 (%) | Second additive | Percentage W2 (%) | A defined as W2/W1 | Electrolytic salt | Concentration of electrolytic salt (M) | B defined as W1/(C1 + C2 + C3) |
|---|---|---|---|---|---|---|---|---|
| 42 | | | | 0.01 | 0.005 | | | 0.29 |
| 43 | | | | 20 | 10 | | | 0.29 |
| 44 | | | Same as Example 6 | | | | 0.8 | 0.29 |
| 45 | | | | | | | 1.5 | 0.29 |
| 46 | | | | | | | 0.5 | 0.29 |
| 47 | | | | | | | 2 | 0.29 |
| 50 | Same as | 3 | Same as | 0.3 | 0.1 | Same as Example 6 | | 0.43 |
| 51 | Example 6 | 0.5 | Example 6 | 5 | 10 | | | 0.07 |
| 52 | | 0.35 | | 1 | 2.9 | | | 0.05 |
| 53 | | 7 | | 2 | 0.29 | | | 1 |
| 62 | Compound 2 | | | | | Same as Example 6 | | |
| 63 | Compound 3 | | | | | | | |
| 64 | Compound 4 | | | | | | | |
| 65 | Compound 5 | | | | | | | |
| 66 | Same as Example 6 | | Ethylene sulfate | | | Same as Example 6 | | |
| 67 | | | Lithium difluorooxalate phosphate | | | | | |
| 68 | | | Lithium difluorooxalate borate | | | | | |
| 69 | | | Same as Example 6 | | | Li(FSO$_2$)$_2$N | Same as Example 6 | |
| 70 | | | | | | LiN(CF$_3$SO$_2$)$_2$ | | |

TABLE 10

Performance data of the positive electrode active materials, button cells, or full cells of Examples 30-70 measured according to the foregoing performance test method

| No. | Amount of Fe and manganese ions dissolved after cycling (ppm) | Button cell gram capacity at 0.1 C (mAh/g) | Cell swelling rate after 30 days of storage at 60° C. (%) | Number of cycles corresponding to 80% capacity retention rate at 45° C. |
|---|---|---|---|---|
| Example 30 | 5 | 156.3 | 2.6 | 1567 |
| Example 31 | 3 | 156.2 | 2.3 | 1534 |
| Example 32 | 9 | 156.0 | 2.9 | 1434 |
| Example 33 | 2 | 155.9 | 2.2 | 1390 |
| Example 34 | 13 | 155.8 | 3.3 | 1178 |
| Example 35 | 1 | 155.3 | 2.1 | 1098 |
| Example 36 | 14 | 155.6 | 3.5 | 1056 |
| Example 37 | 1 | 155.1 | 2.0 | 920 |
| Example 38 | 3 | 156.4 | 2.4 | 1623 |
| Example 39 | 2 | 156.3 | 2.1 | 1601 |
| Example 40 | 3 | 156.1 | 2.4 | 1578 |
| Example 41 | 2 | 156 | 2.0 | 1500 |
| Example 42 | 3 | 155.9 | 2.4 | 1456 |
| Example 43 | 1 | 155.4 | 1.9 | 1301 |
| Example 44 | 3.5 | 155.9 | 3.0 | 1603 |
| Example 45 | 2.8 | 156.2 | 2.3 | 1624 |
| Example 46 | 4.0 | 155.0 | 3.4 | 1534 |
| Example 47 | 2.5 | 154.6 | 2.2 | 1567 |
| Example 50 | 2.9 | 156.3 | 2.3 | 1601 |
| Example 51 | 4.3 | 156.1 | 2.5 | 1531 |
| Example 52 | 6.0 | 156.1 | 3 | 1523 |
| Example 53 | 2.2 | 156.0 | 2.3 | 1456 |
| Example 62 | 4.0 | 156.0 | 2.6 | 1623 |
| Example 63 | 3.8 | 155.8 | 2.4 | 1611 |
| Example 64 | 4.5 | 155.4 | 3.0 | 1589 |
| Example 65 | 6.1 | 155.0 | 3.2 | 1447 |
| Example 66 | 3.5 | 156.2 | 2.5 | 1634 |
| Example 67 | 3.7 | 155.8 | 2.6 | 1612 |
| Example 68 | 3.6 | 156.0 | 2.5 | 1625 |
| Example 69 | 3.0 | 156.3 | 3.3 | 1543 |
| Example 70 | 2.5 | 156 | 3.5 | 1432 |

With the electrolyte in full cells of Examples 1 to 29 replaced by an electrolyte obtained by mixing organic solvents ethylene carbonate (EC) and ethyl methyl carbonate (EMC) at a volume ratio of 3:7 well, adding and dissolving 12.5% by weight (based on the weight of the ethylene carbonate and ethyl methyl carbonate solvents) LiPF$_6$ into the organic solvents, and stirring the mixture well and the electrolyte in button cells replaced by an electrolyte with 1 mol/L LiPF$_6$ in a solution containing ethylene carbonate (EC), diethyl carbonate (DEC), dimethyl carbonate (DMC) at a volume ratio of 1:1:1, the amount of Mn and Fe dissolved (ppm), button cell capacity at 0.1C (mAh/g), 3C constant current charging ratio (%), number of cycles at 80% capacity retention rate at 45° C., and cell swelling rate after storage at 60° C. (%) of the button batteries or full batteries in Comparative examples 4 to 32 formed were tested according to the foregoing method, and the test results were recorded in Table 11.

TABLE 11

| Comparative example no. | 3 C constant current charging ratio (%) | Amounts of Mn and Fe dissolved after cycling (ppm) | Button cell capacity at 0.1 C (mAh/g) | Cell swelling rate after 30 days of storage at 60° C. (%) | Number of cycles at 80% capacity retention rate at 45° C. |
|---|---|---|---|---|---|
| Comparative example 4 | 70.3 | 7 | 157.2 | 4.2 | 1128 |
| Comparative example 5 | 70.2 | 6 | 156.3 | 3.7 | 1253 |
| Comparative example 6 | 70.1 | 5 | 155.4 | 3.4 | 1374 |
| Comparative example 7 | 70.2 | 3 | 153.7 | 2.9 | 1406 |
| Comparative example 8 | 70.1 | 5 | 156.7 | 3.1 | 1501 |
| Comparative example 9 | 69.7 | 4 | 156.2 | 2.8 | 1576 |
| Comparative example 10 | 68.4 | 3 | 155.8 | 2.5 | 1647 |
| Comparative example 11 | 69.1 | 9 | 156.4 | 3.4 | 1058 |
| Comparative example 12 | 73.4 | 6 | 157.6 | 2.9 | 1286 |
| Comparative example 13 | 75.4 | 5 | 157.8 | 2.5 | 1486 |
| Comparative example 14 | 72.4 | 6 | 157.3 | 3.5 | 1026 |
| Comparative example 15 | 74.5 | 4 | 156.3 | 2.5 | 1136 |
| Comparative example 16 | 75.3 | 5 | 156.6 | 3.5 | 1207 |
| Comparative example 17 | 76.5 | 3 | 153.8 | 3.7 | 1308 |
| Comparative example 18 | 74.3 | 3 | 153.8 | 3.7 | 1109 |
| Comparative example 19 | 73.1 | 5 | 154.2 | 3.8 | 1132 |
| Comparative example 20 | 75.3 | 4 | 155.4 | 4.5 | 1258 |
| Comparative example 21 | 76.1 | 4 | 154.3 | 4.7 | 1378 |
| Comparative example 22 | 76.8 | 4 | 154.3 | 4.7 | 1328 |
| Comparative example 23 | 75.4 | 4 | 153.9 | 3.3 | 1458 |
| Comparative example 24 | 76.1 | 4 | 154.5 | 3.5 | 1327 |
| Comparative example 25 | 72.1 | 2 | 152.1 | 2.7 | 1556 |
| Comparative example 26 | 76.4 | 3 | 151.4 | 2.4 | 1645 |
| Comparative example 27 | 76.3 | 3 | 152.1 | 2.5 | 1548 |
| Comparative example 28 | 78.4 | 3 | 158.6 | 2.9 | 1538 |
| Comparative example 29 | 56.4 | 8 | 152.3 | 4.8 | 1017 |
| Comparative example 30 | 74.3 | 6 | 155.4 | 3.8 | 1126 |
| Comparative example 31 | 54.7 | 9 | 154.9 | 6.4 | 986 |
| Comparative example 32 | 68.4 | 7 | 155.6 | 4.5 | 1047 |

It can be seen from the comparison between Table 7 and Table 11 that the compositions of the electrolyte in this application can further improve the energy density and cycling performance of the secondary battery.

It should be noted that this application is not limited to the foregoing embodiments. The foregoing embodiments are merely examples, and embodiments having substantially the same constructions and the same effects as the technical idea within the scope of the technical solutions of this application are all included in the technical scope of this application. In addition, without departing from the essence of this application, various modifications made to the embodiments that can be conceived by persons skilled in the art, and other manners constructed by combining some of the constituent elements in the embodiments are also included in the scope of this application.

What is claimed is:
1. A secondary battery, comprising a positive electrode plate and a non-aqueous electrolyte, wherein:
the positive electrode plate comprises a positive electrode active material with a core-shell structure, the positive electrode active material comprising a core and a shell enveloping the core;
a chemical formula of the core is $Li_{1+x}Mn_{1-y}A_yP_{1-z}R_zO_4$, wherein x is any value in the range of −0.100 to 0.100, y is any value in the range of 0.001-0.500, z is any value in the range of 0.001-0.100, A is one or more elements selected from a group consisting of Zn, Al, Na, K, Mg, Mo, W, Ti, V, Zr, Fe, Ni, Co, Ga, Sn, Sb, Nb, and Ge, R is one or more elements selected from a group consisting of B, Si, N, and S, and values of x, y, and z satisfy the following condition: making the entire core electrically neutral;
the shell comprises a first coating layer enveloping the core, a second coating layer enveloping the first coating layer, and a third coating layer enveloping the second coating layer; wherein
the first coating layer comprises a crystalline pyrophosphate $Li_aMP_2O_7$ and/or $M_b(P_2O_7)_c$, wherein $0 \leq a \leq 2$, $1 \leq b \leq 4$, $1 \leq c \leq 6$, values of a, b, and c satisfy the following condition: making the crystalline pyrophosphate $Li_aMP_2O_7$ and/or $M_b(P_2O_7)_c$ electrically neutral, and each M in the crystalline pyrophosphate $Li_aMP_2O_7$ and/or $M_b(P_2O_7)_c$ is independently one or more elements selected from a group consisting of Fe, Ni, Mg, Co, Cu, Zn, Ti, Ag, Zr, Nb, and Al,
the second coating layer comprises a crystalline phosphate $XPO_4$, wherein X is one or more elements selected from a group consisting of Li, Fe, Ni, Mg, Co, Cu, Zn, Ti, Ag, Zr, Nb, and Al, and
the third coating layer is carbon; and
the non-aqueous electrolyte comprises a first additive, the first additive comprising one or more selected from a group consisting of compounds represented by formula 1 and compounds represented by formula 2,

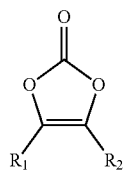

formula 1

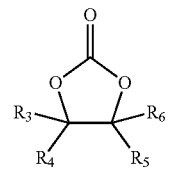

formula 2 wherein:
$R_1$ and $R_2$ each independently represent any one of a hydrogen atom, a halogen atom, a C1-C6 alkyl group, a C1-C6 haloalkyl group, a C1-C6 alkoxy group, a C2-C6 alkenyl group, or a C2-C6 alkynyl group; and $R_3$, $R_4$, $R_5$, and $R_6$ each independently represent any one of a hydrogen atom, a halogen atom, a C1-C6 alkyl group, a C1-C6 haloalkyl group, a C1-C6 alkoxy group, a C2-C6 alkenyl group, a C2-C6 alkynyl group, or a C2-C6 alkynyloxy group, and $R_3$, $R_4$, $R_5$, and $R_6$ do not all represent a hydrogen atom.

2. The secondary battery according to claim 1, wherein: $R_1$ and $R_2$ each independently represent any one of a hydrogen atom, a halogen atom, a C1-C4 alkyl group, a C1-C4 haloalkyl group, a C1-C4 alkoxy group, a C2-C4 alkenyl group, or a C2-C4 alkynyl group; and/or $R_3$, $R_4$, $R_5$, and $R_6$ each independently represent any one of a hydrogen atom, a halogen atom, a C1-C4 alkyl group, a C1-C4 haloalkyl group, a C1-C4 alkoxy group, a C2-C4 alkenyl group, a C2-C4 alkynyl group, or a C2-C4 alkynyloxy group, and $R_3$, $R_4$, $R_5$, and $R_6$ do not all represent a hydrogen atom.

3. The secondary battery according to claim 1, wherein the first additive comprises at least one of the following compounds:

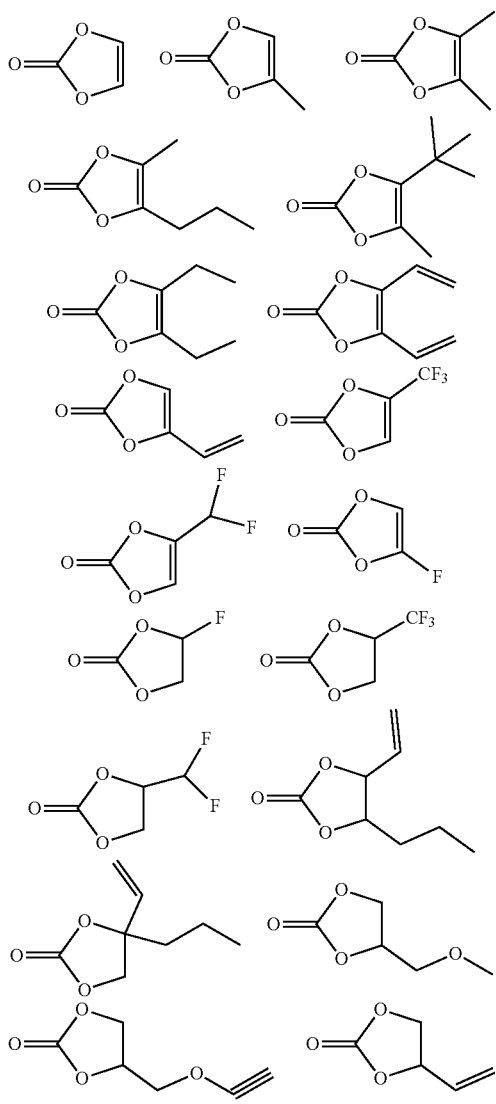

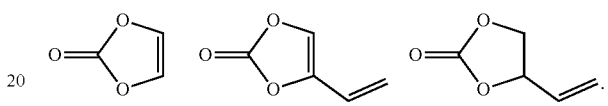

4. The secondary battery according to claim 1, wherein, based on a total weight of the non-aqueous electrolyte, a percentage of the first additive is W1% by weight, W1 being 0.01 to 20.

5. The secondary battery according to claim 1, wherein the first additive is represented by any one of the following compounds:

6. The secondary battery according to claim 1, wherein the non-aqueous electrolyte further comprises a second additive, the second additive comprising one or more selected from a group consisting of ethylene sulfate, lithium difluorophosphate, lithium difluorooxalate phosphate, and lithium difluorooxalate borate.

7. The secondary battery according to claim 6, wherein, based on a total weight of the non-aqueous electrolyte, a percentage of the second additive is W2% by weight, W2 being 0.01 to 20.

8. The secondary battery according to claim 7, wherein, based on the total weight of the non-aqueous electrolyte, the percentage of the first additive is W1% by weight, W1 being 0.01 to 20, and A is a mass ratio of W2/W1, A being 0.1 to 10.

9. The secondary battery according to claim 1, wherein the non-aqueous electrolyte further comprises a third additive, the third additive comprising one or more selected from a group consisting of a chain sulfate compound, a sulfite compound, a sultone compound containing an unsaturated bond, a disulfonic acid compound, a nitrile compound, an aromatic compound, an isocyanate compound, a phosphazene compound, a cyclic anhydride compound, a phosphite compound, a phosphate compound, and a borate compound.

10. The secondary battery according to claim 1, wherein the non-aqueous electrolyte further comprises an organic solvent and an electrolytic salt.

11. The secondary battery according to claim 1, wherein:
based on a weight of the core, a coating amount of the first coating layer is C1% by weight, C1 being greater than 0 and less than or equal to 6; and/or
based on the weight of the core, a coating amount of the second coating layer is C2% by weight, C2 being greater than 0 and less than or equal to 6; and/or
based on the weight of the core, a coating amount of the third coating layer is C3% by weight, C3 being greater than 0 and less than or equal to 6.

12. The secondary battery according to claim 11, wherein:
based on a total weight of the non-aqueous electrolyte, a percentage of the first additive is W1% by weight, W1 being 0.01 to 20, and Q is a ratio of W1/(C1+C2+C3), Q being 0.05 to 1.

13. The secondary battery according to claim 1, wherein:
the crystalline pyrophosphate in the first coating layer has an interplanar spacing in a range of 0.293-0.470 nm and an included angle in a range of 18.00°-32.00° in the [111] crystal orientation; and the crystalline phosphate in the second coating layer has an interplanar spacing in a range of 0.244-0.425 nm and an included angle in a range of 20.00°-37.00° in the [111] crystal orientation.

14. The secondary battery according to claim 1, wherein:
a ratio of y to 1−y in the core is in a range of 1:10 to 1:1; and/or
a ratio of z to 1−z in the core is in a range of 1:9 to 1:999.

15. The secondary battery according to claim 1, wherein carbon in the third coating layer is a mixture of SP2 carbon and SP3 carbon.

16. The secondary battery according to claim 1, wherein:
a thickness of the first coating layer is 1 nm to 10 nm; and/or
a thickness of the second coating layer is 2 nm to 15 nm; and/or
a thickness of the third coating layer is 2 nm to 25 nm.

17. The secondary battery according to claim 1, wherein based a weight of the positive electrode active material:
a percentage of element manganese is in a range of 10%-35% by weight; and
a percentage of element phosphorus is in a range of 12%-25% by weight.

18. The secondary battery according to any claim 1, wherein a lattice change rate of the positive electrode active material with the core-shell structure before and after complete lithium deintercalation or intercalation is lower than 4%.

19. The secondary battery according to claim 1, wherein a Li/Mn antisite defect concentration of the positive electrode active material with the core-shell structure is lower than 4%.

20. The secondary battery according to claim 1, wherein a compacted density of the positive electrode active material with the core-shell structure under a pressure of 3 T is greater than 2.2 g/cm$^3$.

21. The secondary battery according to claim 1, wherein a valence state of surface oxygen of the positive electrode active material with the core-shell structure is lower than −1.90.

22. A battery module, comprising the secondary battery according to claim 1.

23. A battery pack, comprising the battery module according to claim 22.

24. An electric apparatus, comprising the secondary battery according to claim 1.

* * * * *